United States Patent
Hui et al.

(10) Patent No.: US 11,705,730 B2
(45) Date of Patent: Jul. 18, 2023

(54) POWER CONTROL CIRCUIT AND METHOD FOR STABILIZING A POWER SUPPLY

(71) Applicant: VERSITECH LIMITED, Hong Kong (CN)

(72) Inventors: Shu Yuen Ron Hui, Hong Kong (HK); Chi Kwan Lee, Hong Kong (HK); Felix Fulih Wu, Hong Kong (HK)

(73) Assignee: VERSITECH LIMITED, Hong Kong (CN)

( * ) Notice: Subject to any disclaimer, the term of this patent is extended or adjusted under 35 U.S.C. 154(b) by 396 days.

(21) Appl. No.: 15/474,715

(22) Filed: Mar. 30, 2017

(65) Prior Publication Data

US 2017/0256944 A1    Sep. 7, 2017

Related U.S. Application Data

(62) Division of application No. 13/251,823, filed on Oct. 3, 2011.

(Continued)

(51) Int. Cl.
*H02J 3/18* (2006.01)
*H02J 3/12* (2006.01)
(Continued)

(52) U.S. Cl.
CPC ............... *H02J 3/18* (2013.01); *H02J 3/12* (2013.01); *H02J 3/16* (2013.01); *H02J 3/1814* (2013.01);
(Continued)

(58) Field of Classification Search
CPC .......... H02J 3/18; H02J 3/1814; H02J 3/1842; H02J 3/24; H02J 3/34; H02J 3/38;
(Continued)

(56) References Cited

U.S. PATENT DOCUMENTS

| | | |
|---|---|---|
| 5,083,039 A | 1/1992 | Richardson et al. |
| 5,343,139 A | 8/1994 | Gyugyi et al. |

(Continued)

FOREIGN PATENT DOCUMENTS

| | | |
|---|---|---|
| CN | 100347925 C | 6/2006 |
| CN | 20056113100084 | 6/2007 |
| CN | 101707367 A | 5/2010 |

OTHER PUBLICATIONS

International Search Report and Written Opinion for corresponding International Patent Application No. PCT/CN2011/001667 dated Jan. 19, 2012.

(Continued)

*Primary Examiner* — Thienvu V Tran
*Assistant Examiner* — Carlos O Rivera-Perez
(74) *Attorney, Agent, or Firm* — Leason Ellis LLP

(57) ABSTRACT

The present invention provides a power control circuit connectable to a load adapted to receive a power supply, the power control circuit adapted to absorb power from the power supply and adapted to deliver power to the power supply to stabilize at least one electrical parameter of the power supply. The present invention also provides an associated method of stabilizing at least one electrical parameter of a power supply connectable to a load, the method including absorbing power from the power supply or delivering power to the power supply. The at least one electrical parameter of the power supply includes parameters such as voltage and frequency.

45 Claims, 19 Drawing Sheets

Related U.S. Application Data

(60) Provisional application No. 61/389,489, filed on Oct. 4, 2010.

(51) Int. Cl.
*H02J 3/16* (2006.01)
*H02J 3/24* (2006.01)

(52) U.S. Cl.
CPC ............ *H02J 3/1842* (2013.01); *H02J 3/241* (2020.01); *Y02E 40/30* (2013.01)

(58) Field of Classification Search
CPC ........ H02J 3/45; H02J 3/88; H02J 3/12; H02J 3/14; H02J 3/144; H02J 3/16; H02J 3/1807; H02J 3/1821; H02J 3/1828; H02J 3/185; H02J 3/1857; H02J 3/1892; H02J 3/241; Y02E 40/18; Y02E 40/22; Y02E 40/30; Y02E 40/00; Y02E 40/10; Y02E 40/20; Y02E 40/40; H02M 1/4216; H02M 1/4233; H02M 5/40; H02M 5/421; H02M 5/44; H02M 5/443; H02M 5/45; H02M 5/4505; H02M 5/451; H02M 5/452; H02M 5/458; H02M 5/4535; H02M 1/0016; H02M 1/0022; H02M 1/0025; H02M 1/12; H02M 1/123; H02M 1/126; H02M 5/00; H02M 5/02; H02M 5/04; H02M 5/08; H02M 5/257; H02M 5/27–273; H02M 5/293; H02M 5/297; H02M 7/04; H02M 7/062; H02M 7/155; H02M 7/1552; H02M 7/162; H02M 7/217; H02M 7/2173; H02M 7/219; G05F 1/70
USPC ................. 323/205–211, 222–226, 271–275, 323/282–285, 299–303, 351; 363/34, 35, 363/39–43, 123, 131–134
See application file for complete search history.

(56) References Cited

U.S. PATENT DOCUMENTS

| | | | |
|---|---|---|---|
| 5,808,452 | A | 9/1998 | Gyugyi et al. |
| 6,108,223 | A | 8/2000 | Julian |
| 6,215,202 | B1 | 4/2001 | Luongo |
| 6,269,010 | B1 * | 7/2001 | Ma .................... H02M 5/4505 363/138 |
| 6,476,519 | B1 | 11/2002 | Weiner |
| 6,490,177 | B1 | 12/2002 | Figueroa |
| 7,564,227 | B2 | 7/2009 | Dobbins et al. |
| 7,701,087 | B2 * | 4/2010 | Eckroad .................... H02J 3/16 307/46 |
| 8,227,929 | B2 * | 7/2012 | Burra ........................ H02J 3/24 290/44 |
| 2002/0188383 | A1 | 12/2002 | Elek |
| 2005/0035661 | A1 | 2/2005 | Frank |
| 2005/0071050 | A1 | 3/2005 | Chow et al. |
| 2006/0152200 | A1 | 7/2006 | Kanai |
| 2007/0057640 | A1 | 3/2007 | Chung et al. |
| 2007/0063519 | A1 | 3/2007 | Wobben |
| 2007/0222294 | A1 | 9/2007 | Tsukida et al. |
| 2009/0096211 | A1 | 4/2009 | Stiesdal |
| 2010/0208501 | A1 | 8/2010 | Matan |
| 2011/0071695 | A1 * | 3/2011 | Kouroussis .......... G05B 13/021 700/295 |
| 2011/0199061 | A1 | 8/2011 | Shimada |
| 2012/0086382 | A1 | 4/2012 | Peto |
| 2014/0211529 | A1 | 7/2014 | Kandasamy |

OTHER PUBLICATIONS

Supplementary European Search Report dated Aug. 6, 2014 in European Application No. 11830187.

Motoki Tokudome, et al., "Frequency and Voltage Control of Small Power Systems by Decentralized Controllable Loads," PEDS 2009, pp. 666-671.

L. Gyugyi, et al., "The Unified Power Flow Controller: A New Approach to Power Transmission Control," IEEE Transaction on Power Delivery 10 (1995) No. 2.

Lee, et al., "Droop Control of Distributed Electric Springs for Stabilizing Further Power Grid," IEEE Transactions on Smart Grid, vol. 4, No. 3, Sep. 2013, pp. 1558-1566.

M. Emin Meral, et al., "Power quality improvement with extended custom power park," Electric Power Systems Research 79 (2009) pp. 1553-1560.

Non-Final Office Action for U.S. Appl. No. 13/251,823 (U.S Publication No. US 2012/0080420 A1) dated Jan. 29, 2015.

Final Office Action for U.S. Appl. No. 13/251,823 (U.S. Publication No. US 2012/0080420 A1) dated Oct. 29, 2015.

Non-Final Office Action for U.S. Appl. No. 13/251,823 (U.S Publication No. US 2012/0080420 A1) dated Jun. 28, 2016.

Final Office Action for U.S. Appl. No. 13/251,823 (U.S. Publication No. US 2012/0080420 A1) dated Jan. 10, 2017.

Non-Final Office Action for U.S. Appl. No. 13/251,823 (U.S. Publication No. US 2012/0080420 A1) dated May 30, 2017.

Non-Final Office Action for U.S. Appl. No. 13/251,823 (U.S. Publication No. US 2012/0080420 A1) dated Apr. 30, 2018.

Final Office Action for U.S. Appl. No. 13/251,823 (U.S. Publication No. US 2012/0080420 A1) dated Nov. 6, 2018.

Non-Final Office Action for U.S. Appl. No. 13/251,823 (U.S. Publication No. US 2012/0080420 A1) dated Jun. 11, 2019.

* cited by examiner

PRIOR ART

PRIOR ART

POWER CONTROL CIRCUIT AND METHOD FOR STABILIZING A POWER SUPPLY

CROSS-REFERENCE TO RELATED APPLICATIONS

This application claims priority under 35 U.S.C. § 119 to U.S. Provisional Application No. 61/389,489, filed Oct. 4, 2010, and is a divisional of U.S. patent application Ser. No. 13/251,823 filed on Oct. 3, 2011, the entirety of which are both hereby incorporated herein by reference.

FIELD OF THE INVENTION

The present invention relates to power control circuits and methods for stabilizing power supplies, and in particular, but not limited to, circuits and methods of this type that are used with distributed loads connected to a dynamically changing power supply, such as that generated by dynamically changing renewable energy sources.

BACKGROUND OF THE INVENTION

The increasing need for expanding renewable energy sources such as wind, solar, geothermal and ocean wave energy have prompted new concerns about the uncertainties of future power grids, In traditional power systems, the amount and rate of power generation are well-controlled by the power stations, In the emerging grids, also called smart grids, more and more independent and distributed renewable power sources ranging from small-scale rooftop solar panels to large-scale wind farms will be installed in various parts of the power networks with or without central planning. For such dynamically changing smart grids, it would be difficult to precisely predict the power flow within the power grids and therefore it would not be easy to centrally control the power flow within the smart grid systems.

The dynamic and changing nature of power generation in renewable energy sources such as wind (which is dependent on wind speeds) and solar (which is dependent on sunlight) makes prediction of real-time power generation difficult. When the penetration of such dynamically changing renewable power sources into the power grids increases, the percentage of the changing and uncertain elements in the overall power grids also increases. Thus, future smart grid systems may face severe uncertainties and potential voltage stability problems because numerous power sources known or unknown to the utility companies will exist in the power systems in a distributed manner.

In traditional power system stability control, reactive power controllers (also known as reactive power compensators) have been well-researched as a tool to provide voltage stability in power transmission lines as early as 1982, as shown in T. J. Miller, "Reactive Power Control in Electric Systems", John Wiley & Sons, 1982. The basic concept of using reactive power for voltage stability control can be illustrated in FIG. 1a, in which the equivalent circuit and its vector diagram for an ac mains voltage and the transmission line impedance are shown. It can be seen from the vector diagram that the output voltage $V_2$ is reduced because of the transmission line resistance and impedance. In the vector diagram, the active (which is also known as "real") and reactive (which is also known as "imaginary") source current are labeled as $I_p$, and $I_Q$, respectively. It is noted that the active current $I_p$ is in phase with $V_2$ and will contribute to real power consumption in the load. The reactive current $I_Q$ is 90° out of phase (lagging behind) $V_2$, and will not contribute to real power dissipation. Therefore, the power associated with $I_Q$ is called reactive power because it flows into and out of the system without being dissipated.

If a reactive current (and its associated reactive power) is injected into the system as shown in FIG. 1b, the voltage drop due to the reactive current $I_Q$ can be compensated by the injected current $I_Q'$. This means that by controlling the reactive power, the output $V_2$, can be increased or boosted because its voltage drop can be reduced. It should however be noted that if $I_Q'$ is in phase with $I_Q$, $V_2$, can be reduced. This means that the line voltage $V_2$, can be adjusted depending on how the reactive power is injected into the system. FIG. 1b demonstrates the basic concept of shunt reactive power compensation that can be used to stabilize the voltage in a power line. Shunt compensation is also known as parallel compensation because the reactive power source is placed in parallel with the load.

Reactive power compensation can also be done in a series manner. If an auxiliary or compensating voltage source $V_{comp}$ its voltage vector being perpendicular to the current I is created and is placed in series with the load as shown in FIG. 2, the vector diagram shows that the output $V_2$ can be controlled. It should be noted that $V_{comp}$, can be 900 (assisting) or 2700 (opposing) out of phase with I. This means $V_2$, can be increased or decreased to $V_2$,' as shown in FIG. 2. The scheme in FIG. 2 is known as series reactive power compensation because the reactive power source is placed in series with the load.

The series and shunt reactive power compensators can be used individually or together. A unified power flow controller (UPFC) is formed when a series and a shunt reactive power controller are used together as shown in FIG. 3. In FIG. 3, the two reactive power controllers share a common dc power supply created by the capacitor. The anti-parallel diodes of the two inverters form two natural diode rectifiers that connect the ac power line voltages to the dc capacitor. Consequently, the capacitor can be charged up and used as a dc voltage source. The switching actions of the two inverters can be sinusoidally pulsed-width modulated so that their filtered PWM voltage waveforms are sinusoidal (FIG. 4). The magnitude of the output voltage can be controlled by the modulation index and the phase can also be controlled with respect to the current. In FIG. 3, the reactive power of the series and shunt compensators is injected through the isolation transformers into the power lines.

It should however be noted that the reactive power controller can be practically realized with the use of a power inverter and an energy storage element, which can be either a large capacitor acting as a voltage source or an inductor acting as a current source as shown in FIG. 5. In addition, it should be noted that the inverters are not restricted to two-level inverters shown in FIG. 3, FIG. 4 and FIG. 5. Multi-level inverters can in principle be used to generate the ac voltage waveforms. If multi-level inverters are used, the filtering efforts can be reduced at the expense of increased numbers of switches and circuit and control complexity.

In summary, we can see from above descriptions that reactive power controllers can be used to absorb or deliver reactive power. However, reactive power compensators are used for medium to high power applications from hundreds of kilo-Volt-Amperes (kVA) to thousands of kVA. In the form of UPFCs, they are used in high power transmission lines. For power quality improvement, they are installed in heavy-current applications such as welding facilities, which draw large and non-linear currents that deteriorate the power quality of the power source.

On a smaller power scale, "single-phase" reactive power controllers have been proposed for use as dimming devices for lighting systems, as in patent GB2405540.B titled "Apparatus and Method for Providing Green Energy Saving and Dimming Control of Lamps and Electrical Lighting Systems" and GB2418786 titled "Dimmable lighting system". In GB2405540.B, a reactive power controller with a control scheme as shown in FIG. 6 was used to reduce the input ac mains voltage for a lighting system. The idea is to create an auxiliary voltage Va using a "series" reactive power controller (shown in the dotted box) in FIG. 6 so that the output voltage of the controller Vo can be adjusted from the mains voltage Vs (typically 220V to 240V) down to a minimum voltage of 180V, which is the guaranteed minimum voltage for normal lighting system operation suggested by the manufacturers. The dimming level (or the value of the output voltage) is set by a dimming command signal as shown in FIG. 6 and is kept constant at the controlled voltage level so as to keep the light intensity of the lighting system stable. In order to correct the input power factor to close to unity, patent GB2418786 also suggests the use of an extra shunt reactive power controller as a power factor correction circuit. This concept is a modified use of the UPFC in FIG. 3, but its application is for the function of dimming (using a series reactive power controller) and power factor correction (using a shunt reactive power controller). The circuit proposed in FIG. 7 is not intended to be used for power stability as a UPFC is used for very high power systems. For the dimming of lighting, the reactive power controllers in patents GB2405540.B and GB2418786 are used to reduce the output voltage Vo, which has to be less than or equal to the input mains voltage Vs.

Thus, known reactive power controllers are concerned with controlling the output voltage, or Vo as referred to above, of the reactive power controller which is being supplied to the load. In particular, when using series reactive power controllers in existing applications, that is, power system voltage regulation and dimming lighting systems, the controlled variable is the output voltage (or Vo as referred to above) of the series reactive power controller.

SUMMARY OF THE INVENTION

In a first aspect, the present invention provides a power control circuit having an input side and an output side, the power control circuit connectable on the input side to AC mains and connectable on the output side to a non-critical load, the power control circuit adapted to receive power from the AC mains when connected and to deliver power to the AC mains to stabilize a frequency of the AC mains, the AC mains having a dynamically changing power profile and stabilizing the AC mains frequency includes modulating power provided to the non-critical load in order to follow the dynamically changing power profile of the AC mains.

Preferably, the power absorbed and delivered by the power control circuit includes reactive power, or active power, or both.

In one embodiment, the at least one electrical parameter is voltage, the power control circuit maintaining the power supply at a nominal supply voltage. Preferably, the load has a load voltage and the power control circuit provides an auxiliary voltage such that the vectorial sum of the load and auxiliary voltages equal the nominal supply voltage. In one embodiment, the load has a load current and the auxiliary voltage is at a phase angle perpendicular to the load current.

Preferably, the power control circuit is further adapted to deliver power to the load to stabilize the at least one electrical parameter of the power supply.

In another embodiment, the at least one electrical parameter is frequency, the power control circuit maintaining the power supply at a nominal supply frequency. Preferably, the load has a load voltage and the power control circuit decreases the load voltage when the frequency of the power supply is lower than the nominal supply frequency. Also preferably, the load has a load voltage and the power control circuit increases the load voltage when the frequency of the power supply is higher than the nominal supply frequency. The load voltage is preferably increased to exceed a nominal supply voltage. Preferably, the load has a load voltage and the power control circuit provides an auxiliary voltage to increase or decrease the load voltage.

Preferably, the power control circuit includes a power controller for absorbing and delivering power thereby enabling the power control circuit to absorb and deliver power. Preferably, the power controller absorbs and delivers reactive power, or active power, or both. In some embodiments, the power controller is a reactive power controller.

In one embodiment, the power controller is connected in series with the power supply and the load.

In another embodiment, the power controller is connected in parallel across the load.

In yet another embodiment, the power control circuit includes a second power controller, wherein the first power controller is connected in series with the power supply and the load, and the second power controller is connected in parallel across the first power controller and the load. Preferably, the first and second power controllers are interconnected through a power transfer connection. Preferably, the power transfer connection includes an energy storage element. The energy storage element is preferably a capacitor connected in parallel across both the first and second power controllers. Preferably, either or both the first and second power controllers absorb and deliver power to the other of the first and second power controllers through the power transfer connection, and the other of the first and second power controllers absorbs and delivers power to the power supply or to the load. Preferably, the first power controller absorbs and delivers active power to the second power controller through the power transfer connection, and the second power controller absorbs and delivers active power to the power supply. Also preferably, the second power controller absorbs and delivers power to the first power controller through the power transfer connection, and the first power controller absorbs and delivers power to the load.

In a further embodiment, the power control circuit includes a second power controller, wherein the first power controller is connected in series with the power supply and the load, and the second power controller is connected in parallel across the load.

Preferably, the power controller includes a power inverter and an energy storage element. Preferably, the energy storage element is a capacitor or an inductor. Preferably, the power inverter is a two-level power inverter or a multi-level power inverter. Also preferably, the power inverter is a pulse-width modulation power inverter.

Preferably, the power control circuit includes a voltage controller for detecting the voltage of the power supply and providing a voltage control signal based on whether the voltage of the power supply is above or below a nominal supply voltage, the power control circuit referring to the voltage control signal to absorb or deliver power when the voltage of the power supply is above or below the nominal supply voltage, thereby maintaining the power supply at the nominal supply voltage.

Preferably, the power control circuit includes an energy storage element and a second voltage controller, the second voltage controller for detecting a storage voltage across the energy storage element, receiving the voltage control signal provided by the first voltage controller, and providing a second voltage control signal, the power control circuit referring to the second voltage control signal to absorb or deliver power when the voltage of the power supply is above or below the nominal supply voltage, thereby maintaining the power supply at the nominal supply voltage.

Preferably, the voltage controller is a proportional-integral controller or a lead-lag compensator. Preferably, the voltage control signal is provided to a power controller for absorbing and delivering power thereby enabling the power control circuit to absorb and deliver power. In one embodiment, the voltage controller forms part of the power controller.

Preferably, the load has a load voltage, and the power control circuit includes a synchronization network for detecting a phase angle of the power supply and providing a synchronization signal, the power control circuit referring to the synchronization signal to provide an auxiliary voltage at an appropriate phase angle such that the vectorial sum of the load and auxiliary voltages equal a nominal supply voltage, thereby maintaining the power supply at the nominal supply voltage.

Preferably, the synchronization signal is provided to a power controller for absorbing and delivering power to enable the power control circuit to provide the auxiliary voltage at the appropriate phase angle. In one embodiment, the synchronization network forms part of the power controller.

Preferably, the power control circuit includes a frequency controller for detecting the frequency of the power supply and providing a frequency control signal based on whether the frequency of the power supply is above or below a nominal supply frequency, the power control circuit referring to the frequency control signal to absorb or deliver power when the frequency of the power supply is above or below the nominal supply frequency, thereby maintaining the power supply at the nominal supply frequency.

Preferably, the frequency control signal is provided to a power controller for absorbing and delivering power thereby enabling the power control circuit to absorb and deliver power. In one embodiment, the frequency controller forms part of the power controller.

Preferably, the load is a non-critical load. In some embodiments, the load is a hot water heater or a lighting load.

Preferably, the power control circuit is provided integrally with the load.

Preferably, the power control circuit includes a bypass circuit having a bypass switch operable to connect the power supply directly to the load through the bypass circuit.

Preferably, the power supply has a dynamically changing power profile and the power of the load follows the dynamically changing power profile. In one embodiment, the power supply is generated by one or more dynamically changing renewable energy sources.

In a second aspect, the present invention provides a method, the method includes providing a power control circuit having an input side and an output side, the power control circuit connectable on the input side to AC mains and connectable on the output side to a non-critical load and stabilizing a frequency of the AC mains when connected, the stabilizing includes storing power from the AC mains and delivering power to the AC mains.

Preferably, the power being absorbed and being delivered includes reactive power, or active power, or both.

In one embodiment, the at least one electrical parameter is voltage, and the method includes maintaining the power supply at a nominal supply voltage. Preferably, the load has a load voltage and the method includes providing an auxiliary voltage such that the vectorial sum of the load and auxiliary voltages equal the nominal supply voltage. In one embodiment, the load has a load current and the auxiliary voltage is provided at a phase angle perpendicular to the load current.

Preferably, the method includes delivering power to the load to stabilize the at least one electrical parameter of the power supply.

In another embodiment, the at least one electrical parameter is frequency, and the method includes maintaining the power supply at a nominal supply frequency. Preferably, the load has a load voltage and the method includes decreasing the load voltage when the frequency of the power supply is lower than the nominal supply frequency. Also preferably, the load has a load voltage and the method includes increasing the load voltage when the frequency of the power supply is higher than the nominal supply frequency. The load voltage is preferably increased to exceed a nominal supply voltage. Preferably, the load has a load voltage and the method includes providing an auxiliary voltage to increase or decrease the load voltage.

Preferably, the method includes providing a power controller for absorbing and delivering power.

In one embodiment, the power controller is connected in series with in series with the power supply and the load.

In another embodiment, the power controller is connected in parallel across the load.

In yet another embodiment, the method includes providing a second power controller, wherein the first power controller is connected in series with the power supply and the load, and the second power controller is connected in parallel across the first power controller and the load.

In a further embodiment, the method includes providing a second power controller, wherein the first power controller is connected in series with the power supply and the load, and the second power controller is connected in parallel across the load.

Preferably, the method includes providing a voltage controller for detecting the voltage of the power supply and providing a voltage control signal based on whether the voltage of the power supply is above or below a nominal supply voltage, referring to the voltage control signal to absorb or deliver power when the voltage of the power supply is above or below the nominal supply voltage, thereby maintaining the power supply at the nominal supply voltage.

Preferably, the load has a load voltage, and the method includes providing a synchronization network for detecting a phase angle of the power supply and providing a synchronization signal, referring to the synchronization signal to provide an auxiliary voltage at an appropriate phase angle such that the vectorial sum of the load and auxiliary voltages equal a nominal supply voltage, thereby maintaining the power supply at the nominal supply voltage.

Preferably, the method includes providing a frequency controller for detecting the frequency of the power supply and providing a frequency control signal based on whether the frequency of the power supply is above or below a nominal supply frequency, referring to the frequency control signal to absorb or deliver power when the frequency of the power supply is above or below the nominal supply frequency, thereby maintaining the power supply at the nominal supply frequency.

Preferably, the method includes providing a power control circuit for absorbing and delivering power. Preferably, the power control circuit is provided integrally with the load.

Preferably, the power supply has a dynamically changing power profile and power is absorbed from the power supply or delivered to the power supply such that the power of the load follows the dynamically changing power profile.

BRIEF DESCRIPTION OF THE FIGURES

Preferred embodiments in accordance with the best mode of the present invention will now be described, by way of example only, with reference to the accompanying figures, in which.

DETAILED DESCRIPTION OF THE BEST MODE OF THE INVENTION

Figure 1A:
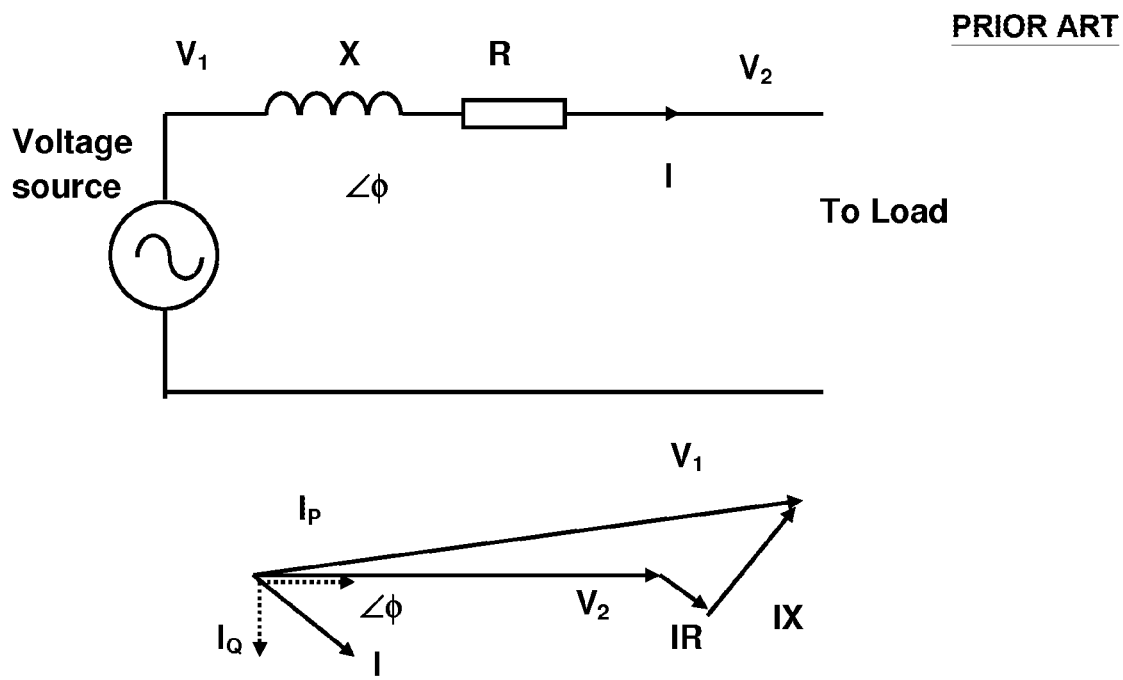
FIG. 1a is a schematic diagram of an equivalent circuit for a prior art AC mains power supply without reactive power compensation, shown together with a vector diagram of various electrical parameters of the circuit.
Figure 1B:
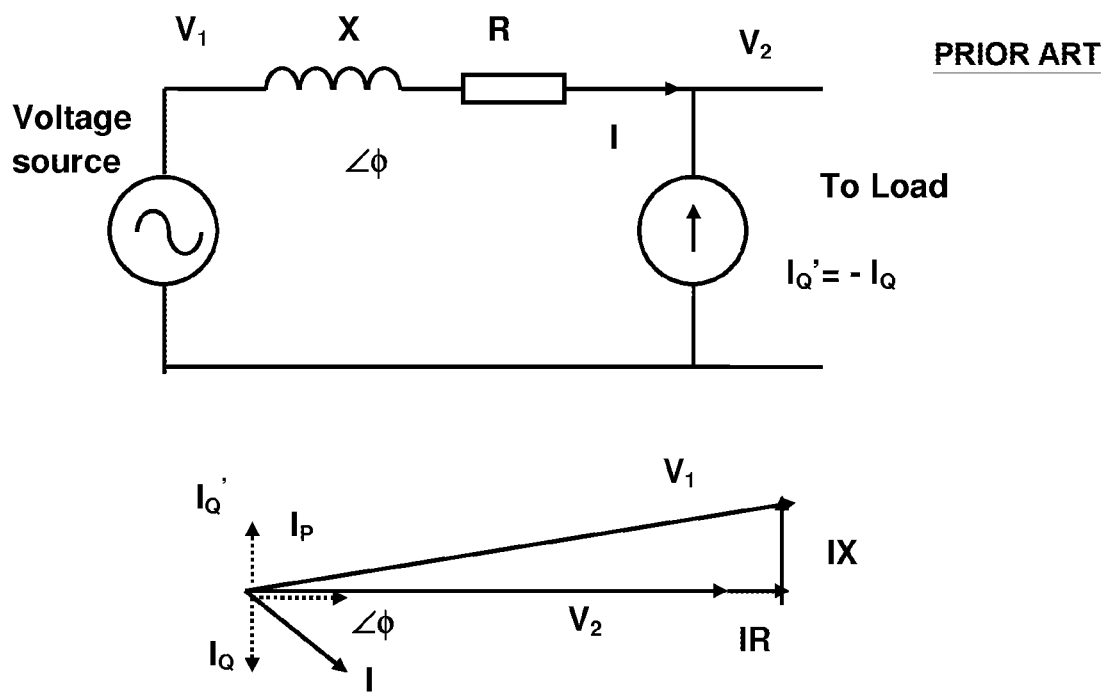
FIG. 1b is a schematic diagram of an equivalent circuit for a prior art AC mains power supply with shunt reactive power compensation, shown together with a vector diagram of various electrical parameters of the circuit.
Figure 2:
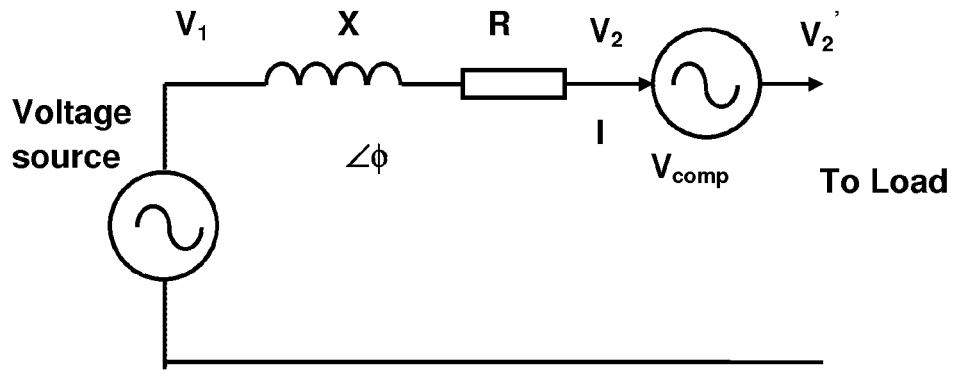
FIG. 2 is a schematic diagram of an equivalent circuit for a prior art AC mains power supply with series reactive power compensation, shown together with a vector diagram of various electrical parameters of the circuit.
Figure 2:
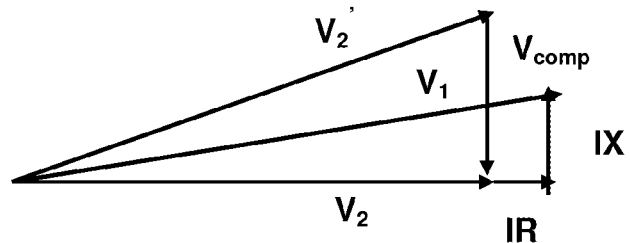

Referring to the figures, there is provided a power control circuit 1 connectable to a load 2 adapted to receive a power supply 3. The power control circuit 1 is adapted to absorb power from the power supply 3 and adapted to deliver power to the power supply 3 to stabilize at least one electrical parameter of the power supply 3. The power absorbed and delivered by the power control circuit 1 includes reactive power, or active power, or both.

In some embodiments, the power control circuit 1 is further adapted to deliver power to the load 2 to stabilize the at least one electrical parameter of the power supply 3.

Also in some embodiments, the at least one electrical parameter is voltage, with the power control circuit 1 maintaining the power supply 3 at a nominal supply voltage Vs. This nominal supply voltage can be any of the nominal mains voltages provided by power grids in various countries. For example, the nominal supply voltage can be 110V, 220V, 230V, or 240V. In a particular embodiment, the load 2 has a load voltage Vo and the power control circuit 1 provides an auxiliary voltage Va such that the vectorial sum of the load and auxiliary voltages equal the nominal supply voltage Vs. In another particular embodiment, the load 2 has a load current Io and the auxiliary voltage Va is at a phase angle perpendicular to the load current Io.

In some other embodiments, the at least one electrical parameter is frequency, with the power control circuit 1 maintaining the power supply 3 at a nominal supply frequency. This nominal supply frequency can be any of the nominal mains frequencies provided by power grids in various countries. For example, the nominal supply frequency can be 50 Hz or 60 Hz.

In one embodiment, the load 2 has a load voltage Vo and the power control circuit 1 can decrease the load voltage when the frequency of the power supply is lower than the nominal supply frequency, The power control circuit 1 can also increase the load voltage Vo when the frequency of the power supply is higher than the nominal supply frequency. In particular, the load voltage Vo is increased to exceed a nominal supply voltage Vs. This can be done by having the power control circuit 1 provide an auxiliary voltage Va to increase or decrease the load voltage Vo, In this way, more real, or active, power can be consumed by the load 2 so as to reduce the frequency of the power supply. Further, if there are a large number of the loads 2 controlled by respective power control circuits 1, and distributed over a power supply grid, the overall frequency regulation of the whole grid will be improved.

It will be appreciated that in some embodiments, the power control circuit 1 stabilizes both the electrical parameters of voltage and frequency of the power supply 3, with the power control circuit 1 maintaining the power supply 3 at a nominal supply voltage Vs, and maintaining the power supply 3 at a nominal supply frequency, as described above.

In some embodiments, the power control circuit 1 includes a power controller 4 for absorbing and delivering power thereby enabling the power control circuit 1 to absorb and deliver power. The power controller 4 can absorb and deliver reactive power, or active power, or both. For example, in many of the embodiments described here, the power controller 4 is a reactive power controller.

Thus, the present invention proposes the methodology of using (1) the reactive power of the reactive power controller and/or (2) the active power control of the loads as a new generation of "smart loads" that serve the dual purposes of maintaining power grid stability and controlling the power consumptions of the loads. The proposed smart load methodology involves both (1) the control of reactive power of the reactive power controller and (2) control of the active power consumption of the loads.

Figure 3:
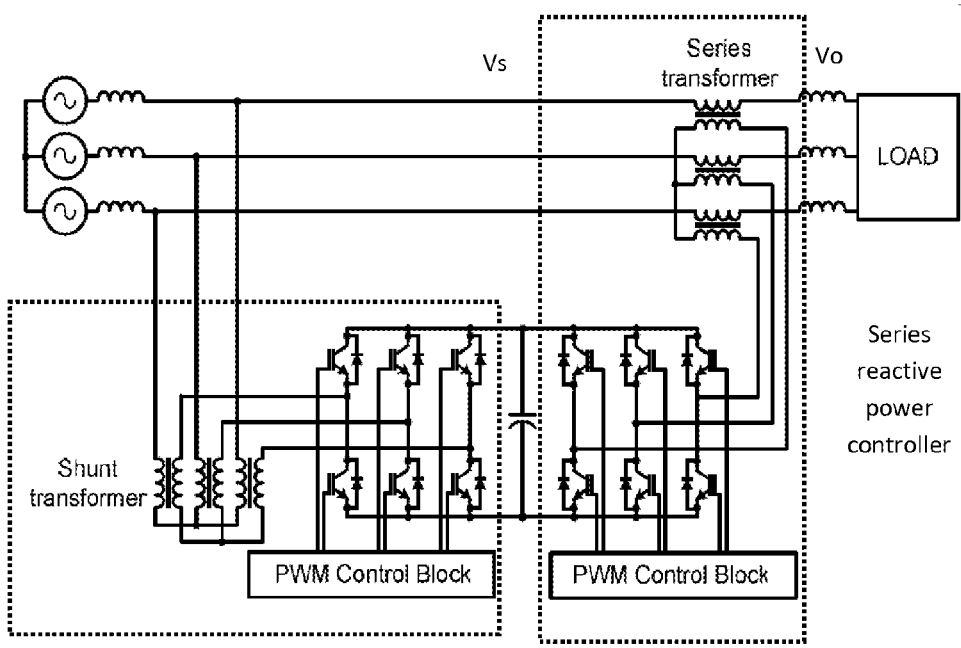
FIG. 3 is a schematic circuit diagram of a prior art unified power flow controller based on the combined use of a shunt and a series reactive power controller sharing the same DC voltage source.
Figure 4:
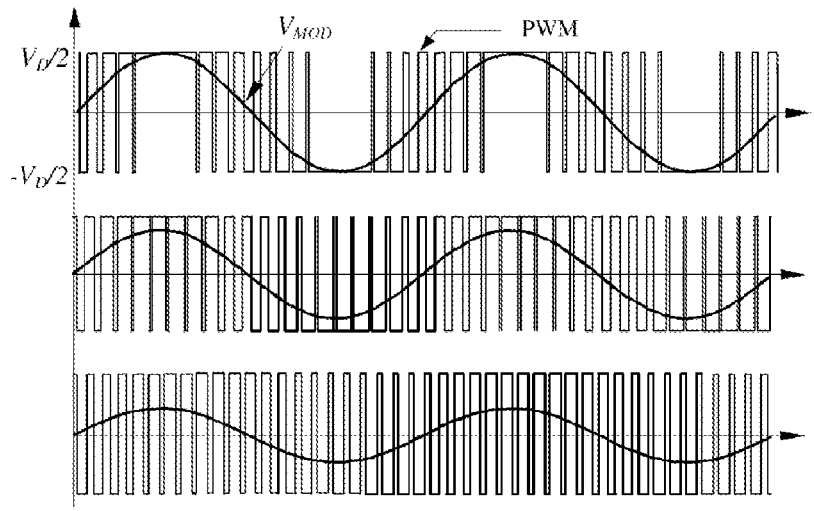
FIG. 4 shows graphs of sinusoidal PWM switching actions of a prior art inverter for generating controllable sinusoidal output voltages after low-pass filtering.
Figure 5A:
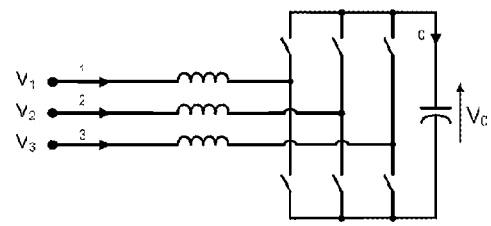
FIG. 5a is a schematic circuit diagram of a prior art reactive power controller based on a voltage source inverter.
Figure 5B:
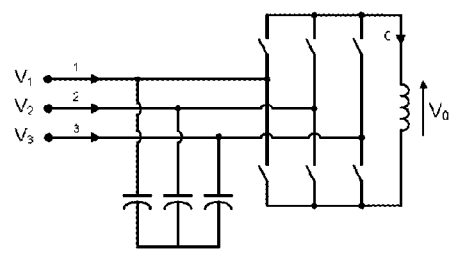
FIG. 5b is a schematic circuit diagram of a prior art reactive power controller based on a current source inverter.
Figure 6A:
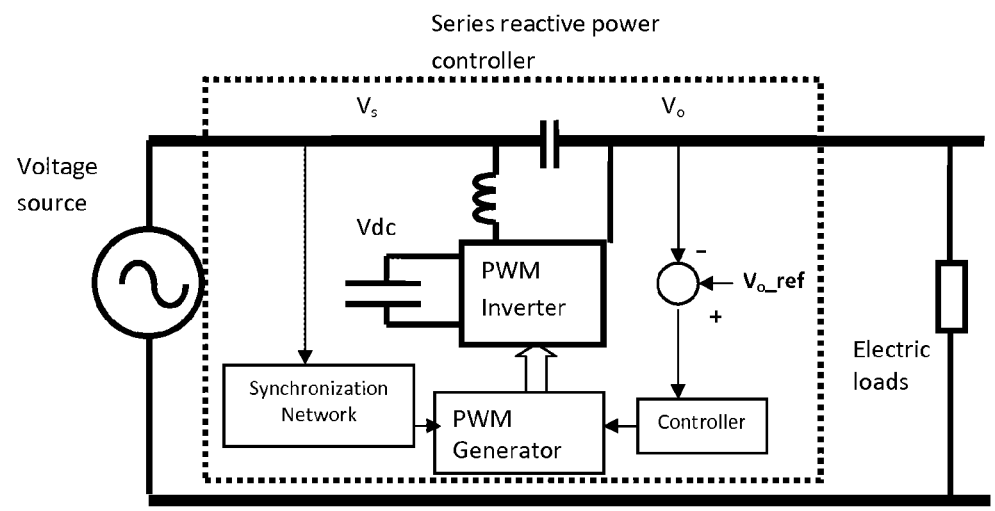
FIG. 6a is a schematic diagram of a prior art circuit using a series reactive power controller which is shown enclosed in a dotted box.
Figure 6B:
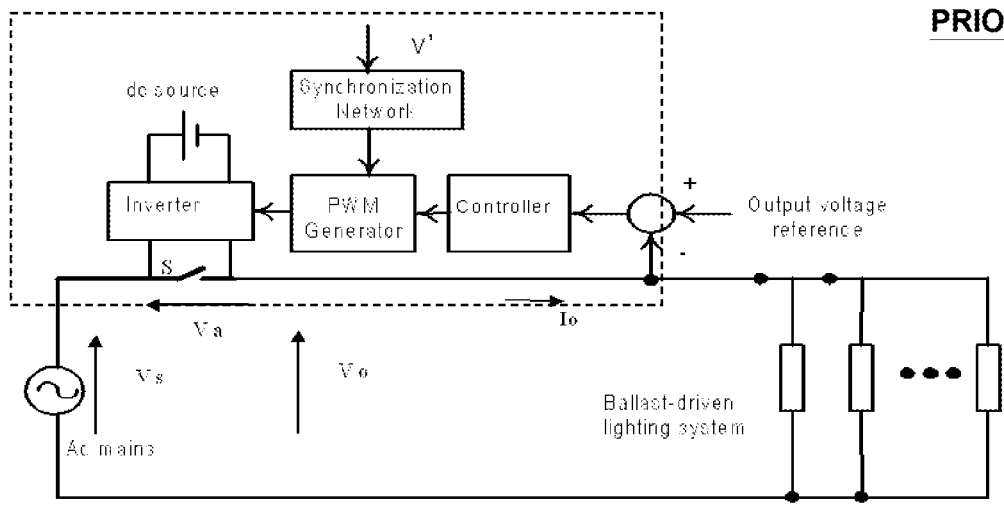
FIG. 6b is a schematic circuit diagram of a prior art central dimming system for large-scale lighting networks, in which the dotted box encloses a reactive power controller.
Figure 7:
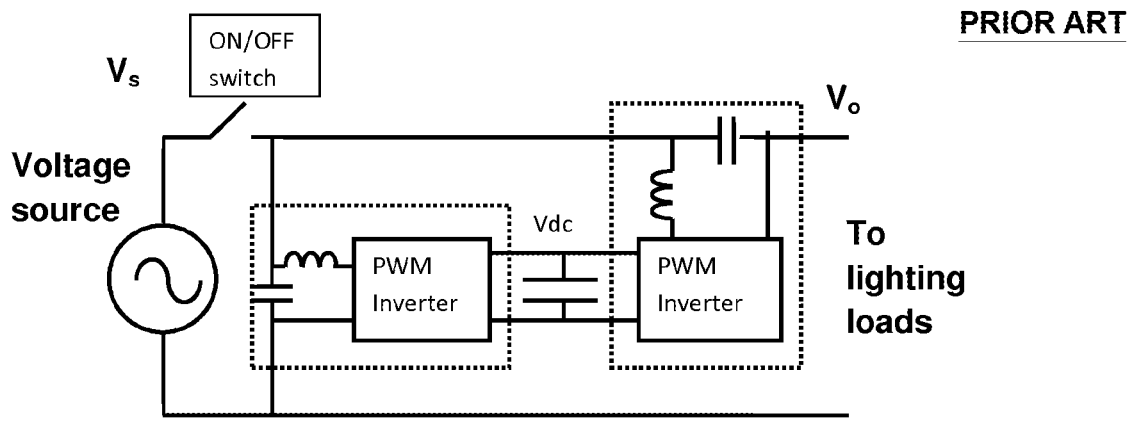
FIG. 7 is a schematic circuit diagram of a prior art central dimming system for large-scale lighting networks with a series reactive power controller for dimming and a shunt reactive power controller for improving the input power factor of the dimmable lighting system.

To achieve this novel methodology, a new control method and apparatus are proposed which are different from previous control methods of reactive power controller. In traditional uses of series reactive power controllers in power systems (FIG. 3) and in dimming control for lighting systems (FIG. 7), the control variable is the "output voltage Vo" of the series reactive power controller. The control of the output variable is common and traditional. In embodiments of the present invention, the "input voltage Vs" of the series reactive power controller is controlled. This "input variable control" method is different from traditional "output variable control" method. With this new control methodology, a series reactive power controller connected in series with an electric load can form a "smart load" unit that provides reactive power compensation for mains voltage regulation and enables the load power to follow the profile of the power generation.

In some embodiments, the reactive power controller 4 can be designed as a separate unit to the load 2 or it can be designed with the load in an integrated manner. It can be used for both electric loads with variable power consumption and also for loads with constant power, depending on the configurations of the reactive power controllers.

Since this smart load methodology can be applied to many domestic, industrial and public applications (such as water heaters, indoor and outdoor public lighting networks, refrigerators, etc), smart loads based on embodiments of the present invention can be installed all over smart grids and provide stabilizing effects (or cushioning effects) to power lines over the smart grids. For example, the proposed methodology of the invention can be adopted in domestic water heaters and road lighting systems, which are distributed all over cities by the nature of their mode of installation.

Essentially, a reactive power controller can absorb and deliver reactive energy so it can effectively vary (decrease and increase) the power line voltage. We can consider the functions of a reactive power controller in an analogy using a mechanical spring.

Figures 8A, 8B, 8C:
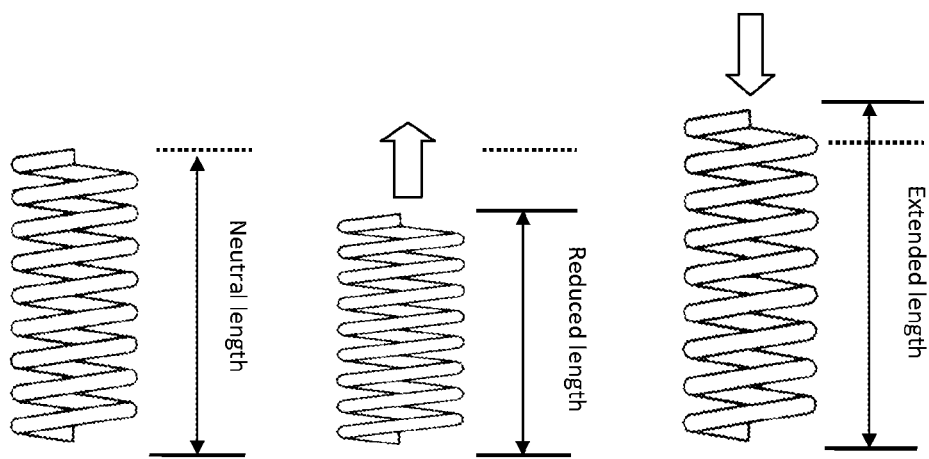
FIG. 8a is a diagram of a mechanical spring with a neutral length generating no force generated.
FIG. 8b is a diagram of a mechanical spring with a reduced length generating upward force.
FIG. 8c is a diagram of a mechanical spring with an extended length generating downward force.
Figure 9:
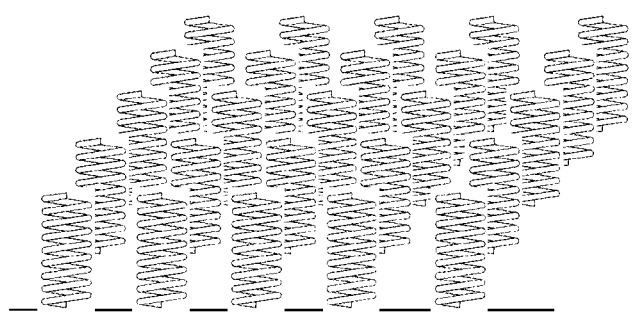
FIG. 9 is a diagram of an array of distributed mechanical springs, such as that in a mattress, capable of absorbing mechanical disturbances.

Consider a mechanical spring as shown in FIG. 8. With no external force or disturbance, the length of the spring remains in its neutral position as shown in FIG. 8(*a*). If the spring experiences an external force which reduces its length, an upward force (acting to restore the neutral length) will result from the spring as shown in FIG. 8(*b*). On the other hand, the spring will exert a downward force (acting to restore the neutral length) as shown in FIG. 8(*c*) if an external force causes the length of the spring to extend beyond its neutral length. The illustrations in FIG. 8 highlight the fact that a mechanical spring can be used to provide cushioning and damping effects if there is an external disturbance causing the length of the spring to oscillate or the neutral length of the spring to change. This characteristic of a mechanical spring makes the spring suitable for mechanical suspension applications. If mechanical springs are distributed over a large area (such as in a mattress) as shown in FIG. 9, it can be understood that such a distributed spring structure can be used to provide support, absorb mechanical disturbances and damp down mechanical oscillations over a large surface.

In one embodiment of the present invention, a reactive power controller 4 is proposed to be used as an "electric spring" or "voltage stabilizer" to keep stable the voltage of the power lines to which this reactive power controller is connected. The ability of the reactive power controller to absorb and deliver reactive power can be used to maintain voltage stability. Since the reactive power controllers are connected with the electric loads to form "smart loads", which are distributed for example over cities or other power grids, the installations of the proposed smart loads will provide many local "electric springs" or "voltage stabilizers" distributed all over the cities or the power grids to form "smart grids". They can therefore provide voltage stabilization and damping of oscillations over the power grids. Such distributed voltage support over a large power network of smart grids is similar to the distributed mechanical support provided by the springs of a mattress as shown in FIG. 9.

Figures 10A, 10B, 10C, 10D:
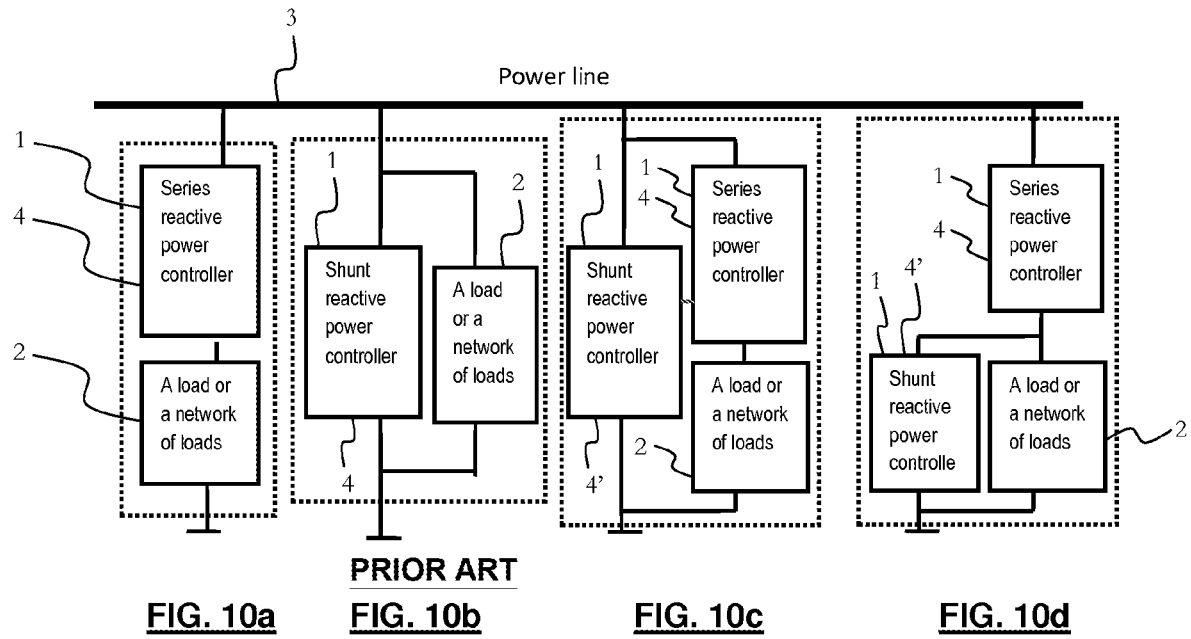
FIG. 10a is a schematic diagram of a series power control circuit in accordance with an embodiment of the present invention.
FIG. 10b is a schematic diagram of a prior art shunt power control circuit.
FIG. 10c is a schematic diagram of a series and shunt power control circuit in accordance with another embodiment of the present invention.
FIG. 10d is a schematic diagram of a series and shunt power control circuit in accordance with a further embodiment of the present invention.

Now let us consider the realization of such electric springs. There can be at least four structures based on this novel smart load concept as illustrated in FIG. 10. These smart load structures can be single-phase or multiple-phase. They are:

"Structure-1": a series structure, as shown in FIG. 10a;
"Structure-2"; a shunt structure, as shown in FIG. 10b;
"Structure-3": a first series and shunt structure, as shown in FIG. 10c; and
"Structure-4"; a second series and shunt structure, as shown in FIG. 10d.

To develop smart loads with voltage regulatory functions and load power variation functions, the control loop of the reactive power controller will be much different from that used in GB2405540.B and GB2418786, which are proposed not for power grid voltage stabilization, but for the dimming of lighting systems only.

The smart load with the series reactive power controller structure is now explained with the aid of FIG. 11. The loads here could be any electric loads that do not require constant power. Application examples are domestic and industrial water heaters, individual lighting system or preferably a network of lighting systems for public areas, and some electrical appliances that can tolerate a wider fluctuation of supply voltage that exceeds the nominal tolerance. These are also known as "non-critical" loads.

Figure 11A:
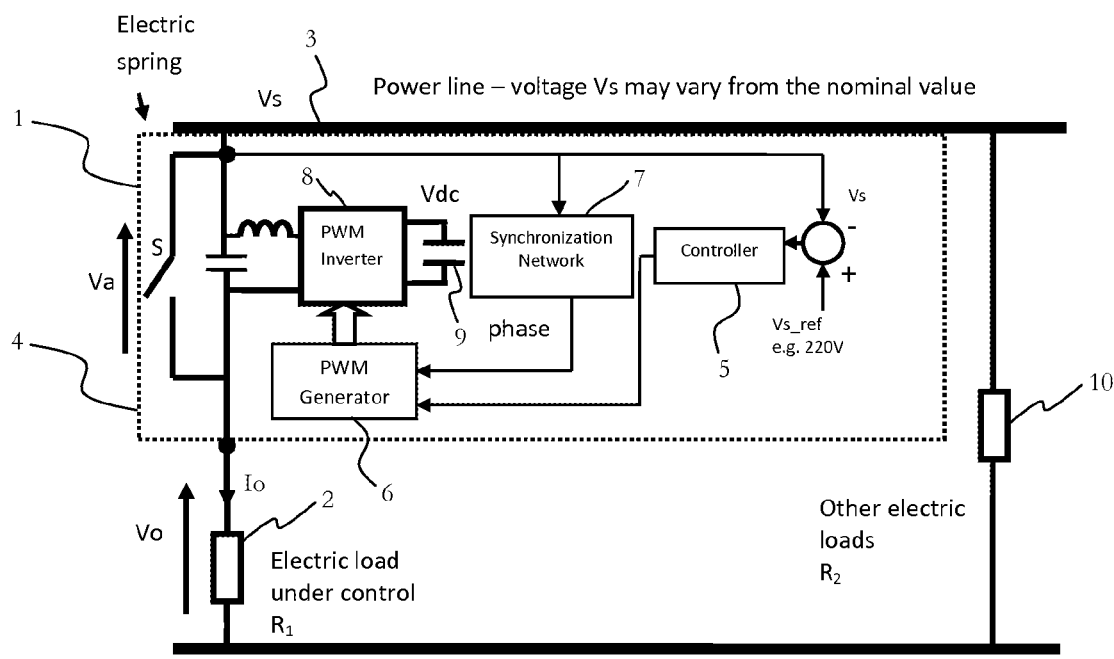
FIG. 11a is a schematic diagram of a power control circuit in accordance with an embodiment of the present invention.
Figure 11B:
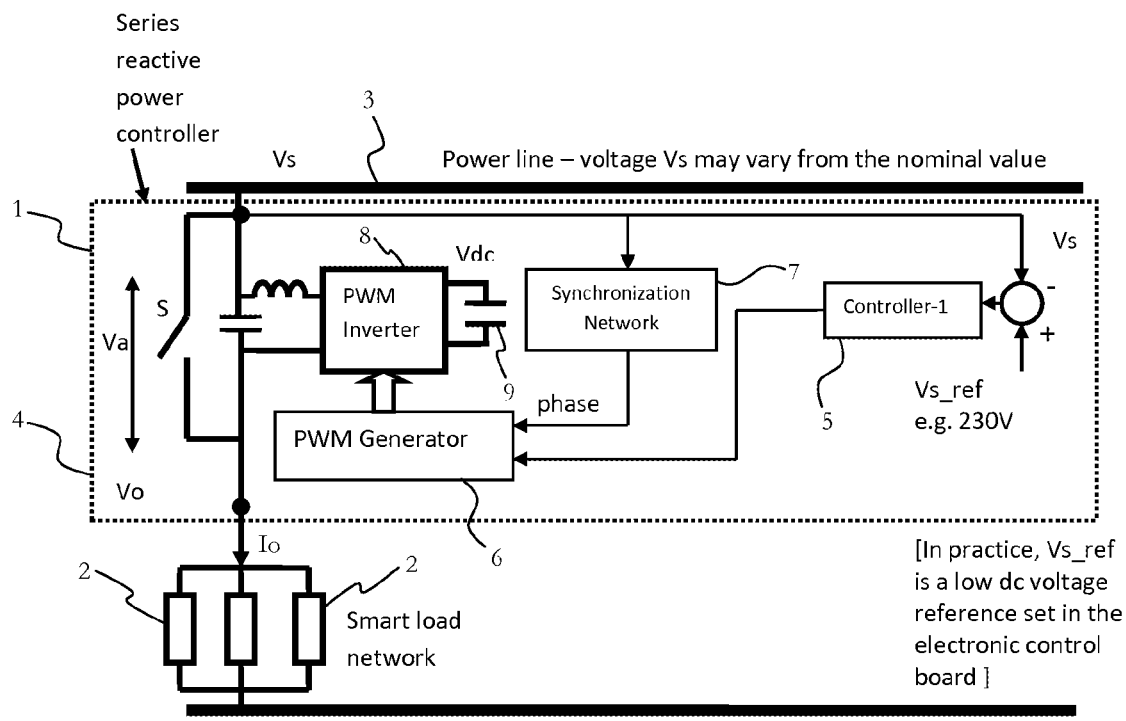
FIG. 11b is a schematic diagram of a power control circuit in accordance with another embodiment of the present invention.

FIG. 11a shows the schematic of a series-type smart load control method (i.e. Structure-1 of FIG. 10). Unlike the use of reactive power controllers for dimming purposes which sets a load voltage reference Vo_ref for controlling the load voltage Vo, the new control method of embodiments of the present invention uses the nominal mains voltage, also called the nominal supply voltage, Vs_ref as a reference. For example, for countries that use a nominal supply voltage of 230V as phase voltage, the voltage reference of this control method Vs_ref could be set in the electronic control board of the control system as equivalent to 230V. This voltage reference representing 230V is implemented as a constant voltage in the control board of a power controller in accordance with an embodiment of the present invention. The switch S is a bypass switch, which when closed, allows power to bypass the series reactive power controller and connects the load directly to the power lines without reactive power control. FIG. 11b shows a similar schematic which includes a network of loads, instead of a single load.

The difference between the actual ac mains voltage Vs and the reference mains voltage is fed to a voltage controller 5, which can be any suitable controller such as a proportional-integral (PI) controller or a lead-lag compensator. The output of the voltage controller 5 provides a control signal for the Pulse-Width-Modulated (PWM) Generator 6. A synchronization network 7 is used to provide the phase information for the PWM Generator 6, which generates the switching signals for the power semiconductor switches of a power inverter 8 to generate a high-voltage sinusoidal PWM voltage waveform. The dc voltage of the power inverter 8 is usually obtained from a capacitor 9 which is charged through the anti-parallel diodes of the inverter switches (like a diode rectifier with an output dc capacitor). The PWM voltage generated by the power inverter 8 is filtered by a low-pass LC filter so that an auxiliary sinusoidal voltage Va can be created. As long as the vector of Va is perpendicular (either 90° or 270°) with the vector of the load current Jo, the power inverter 8 (being used as part of a reactive power controller) will not consume active power in the process of creating the auxiliary voltage Va, assuming that the conduction loss, core loss and the switching loss of the power inverter circuit and filter are negligible. Since the auxiliary voltage Va can be generated in either polarity, so that the series reactive power controller will cause the actual power line voltage Vs to follow its nominal reference value Vs_ref, the schematic proposed in FIG. 11 can be considered as an "electric spring" or "voltage stabilizer" as shown in FIG. 12.

Figure 11C:
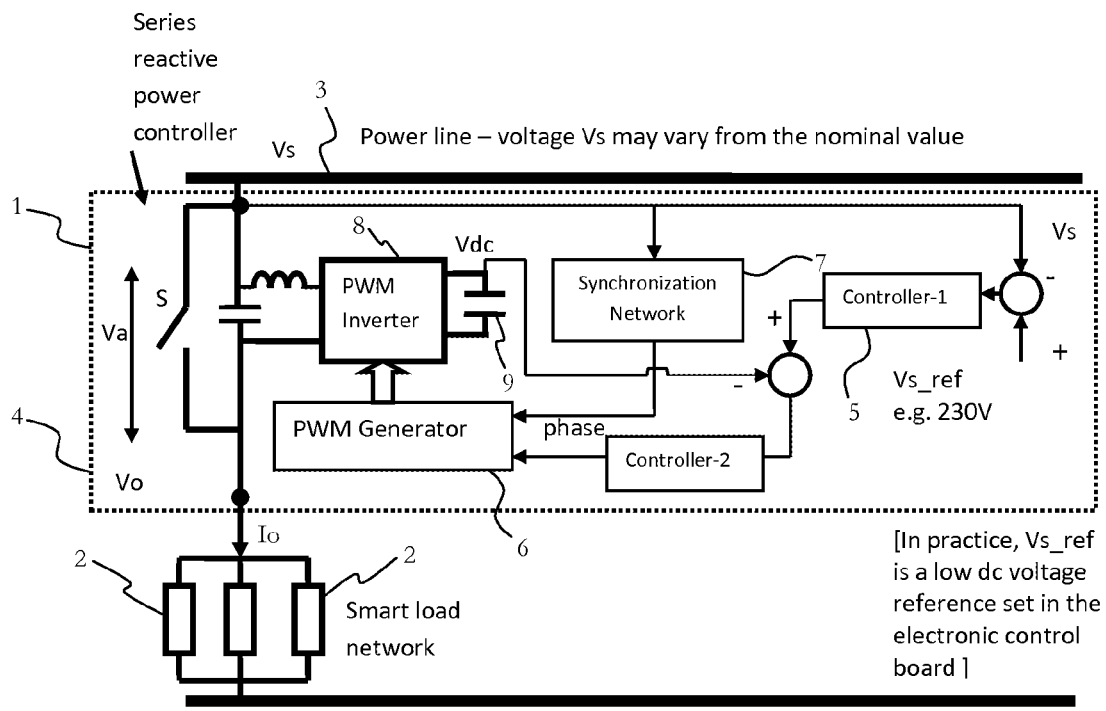
FIG. 11c is a schematic diagram of a power control circuit in accordance with yet another embodiment of the present invention.
Figure 12:
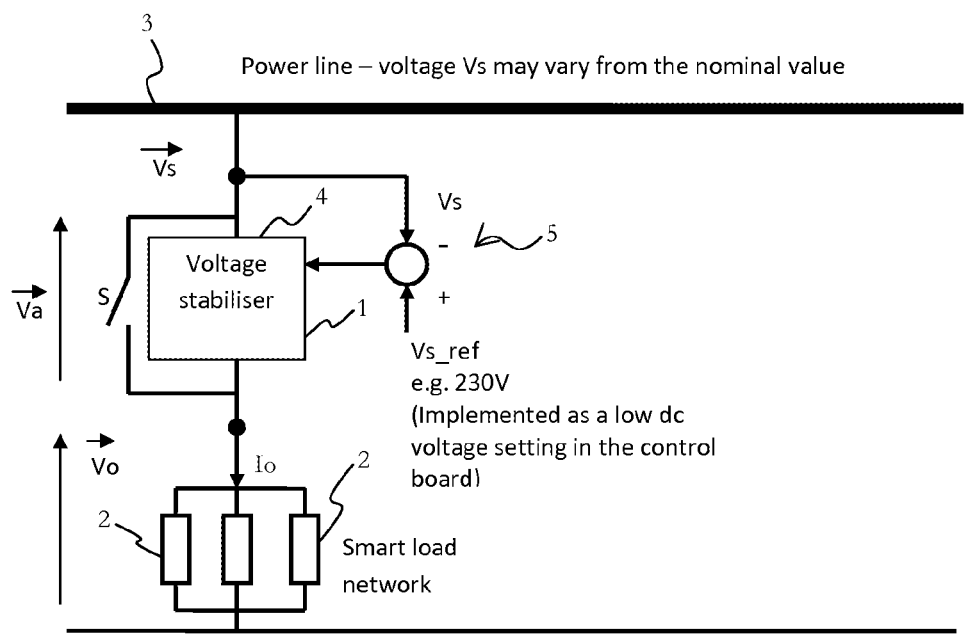
FIG. 12 is a simplified schematic diagram of the power control circuits of FIGS. 11b and 11c.

An alternative control method for fast response of the series structure is shown in FIG. 11c. The novel feature of having a series reactive power controller connected in series with the load, with the combined unit connected to the power lines remains the same as FIGS. 11a and 11b. However, unlike the control methods shown in FIGS. 11a and 11b, this method includes a fast inner control loop based on the sensing of the dc voltage across the storage capacitor 9. Since the magnitude of the voltage Va generated by the PWM inverter 8 depends on the dc voltage Vdc, any variation of Vdc is a faster indication of the load demand response than the indication obtained from the variation of the rms value of Vs.

All of the control methods illustrated in FIGS. 11a, 11b and 11c can be incorporated into shunt reactive power control to form an electric spring either (i) as an independent unit for turning an existing load into a smart load or (ii) as an integrated part of the load to form an integrated smart load.

Figure 13:
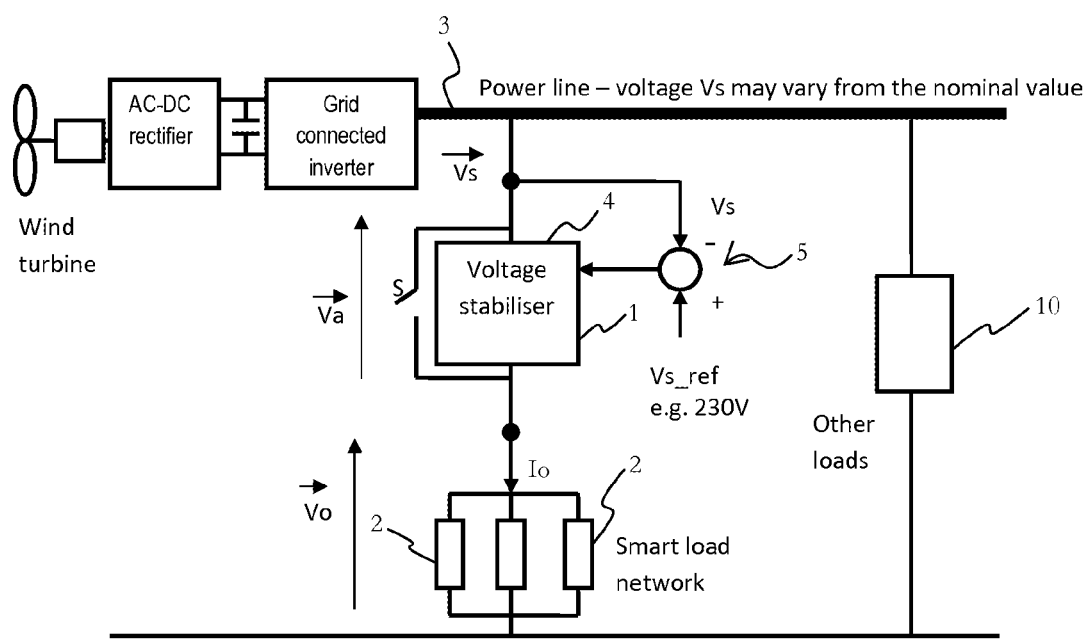
FIG. 13 is a schematic diagram of a 10 kVA experimental setup including loads controlled by a power control circuit in accordance with an embodiment of the present invention, and other loads.
Figure 14A:
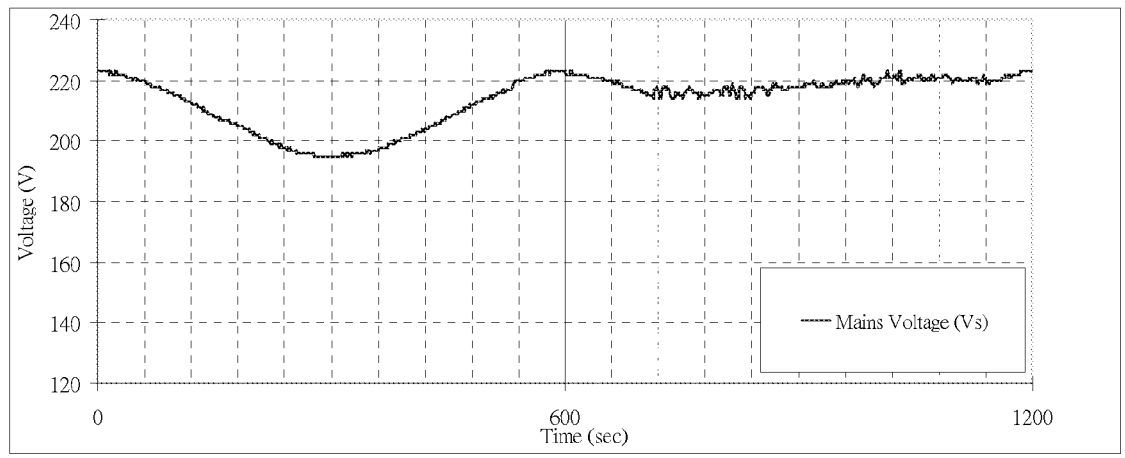
FIGS. 14a to 14f show graphs of results from tests conducted with the experimental setup of FIG. 13, with the graphs showing various electrical parameters of the circuit during the tests.
Figure 14B:
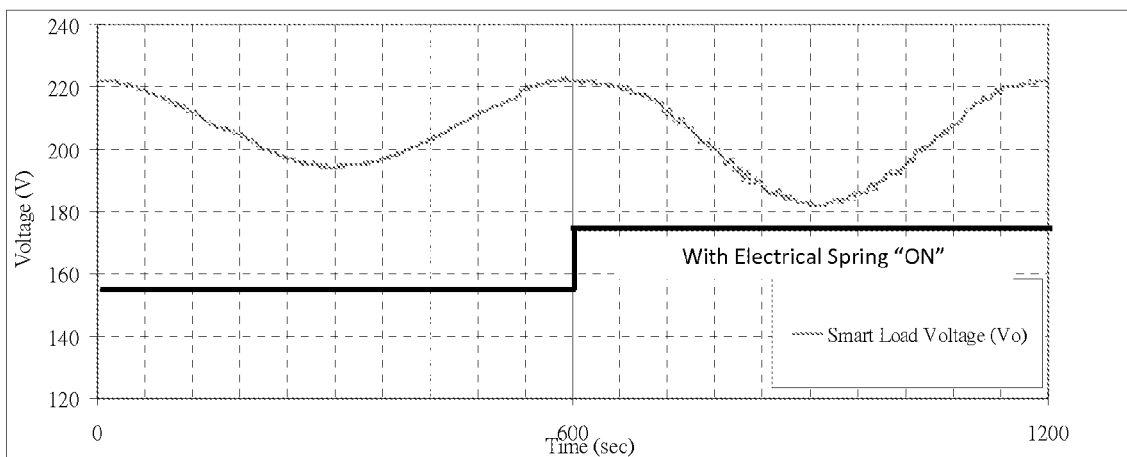
Figure 14C:
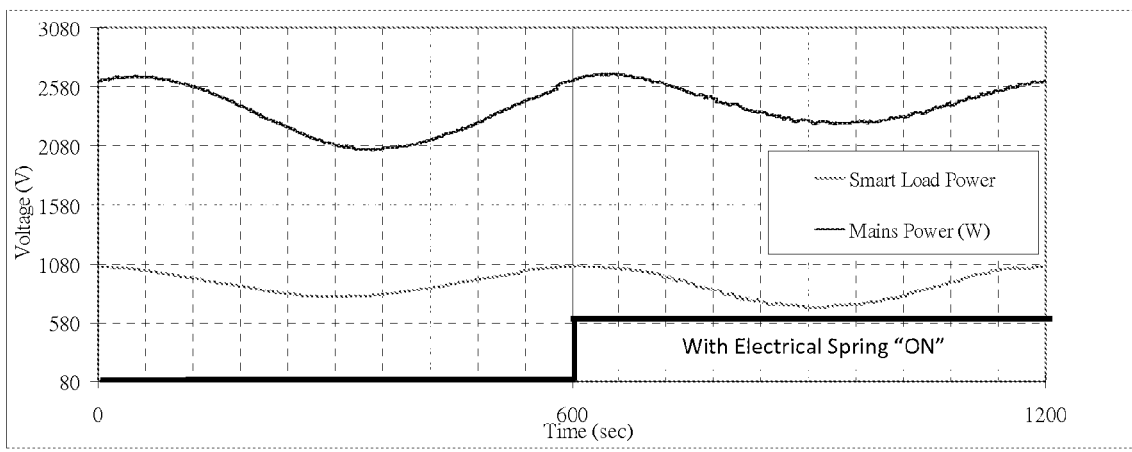
Figure 14D:
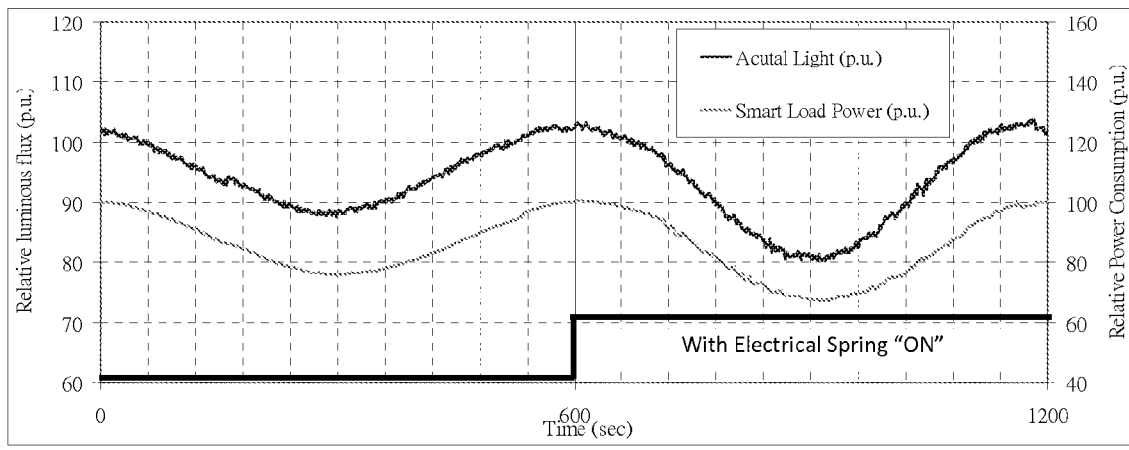
Figure 14E:
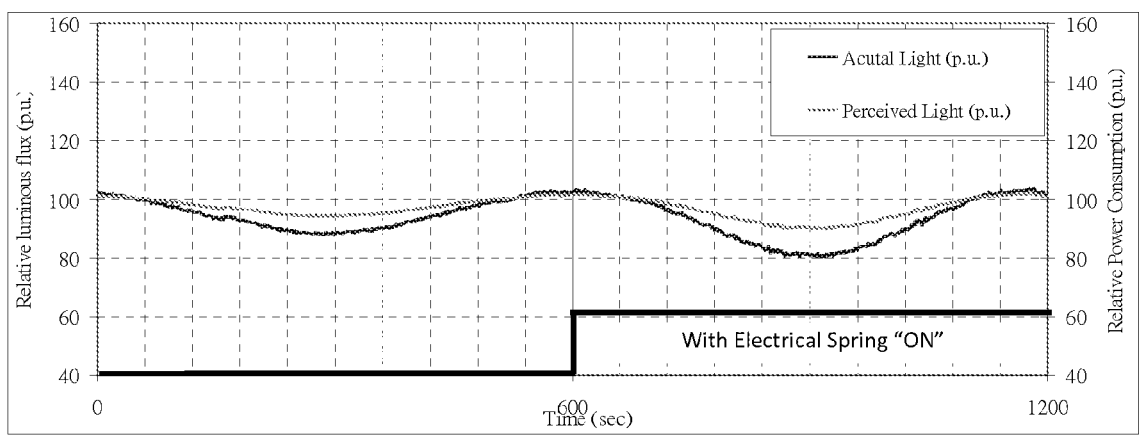
Figure 14F:
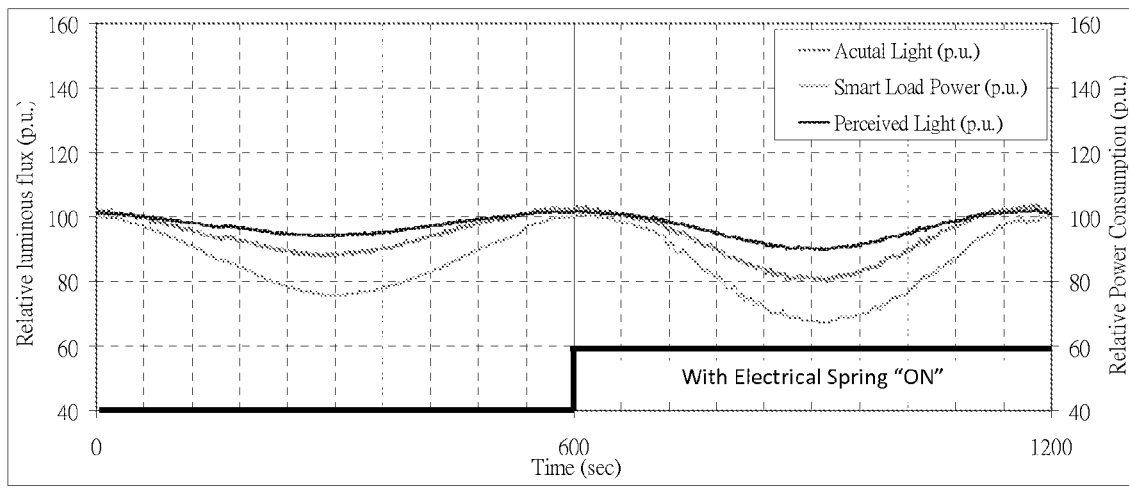
Figure 15A:
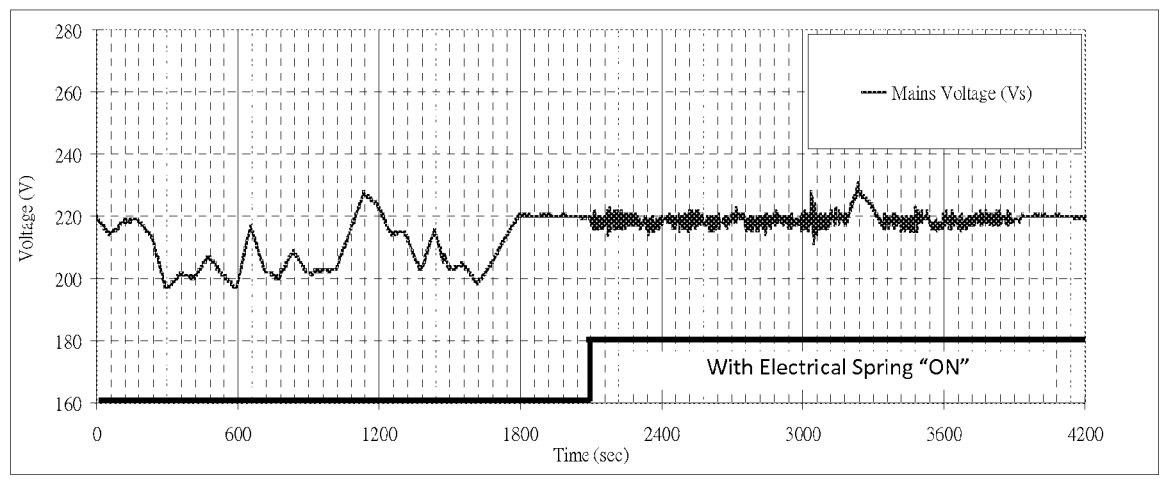
FIGS. 15a to 15f show graphs of results from further tests conducted using a real wind speed profile on a power control circuit in accordance with an embodiment of the present invention, with the graphs showing various electrical parameters of the circuit during the tests.
Figure 15B:
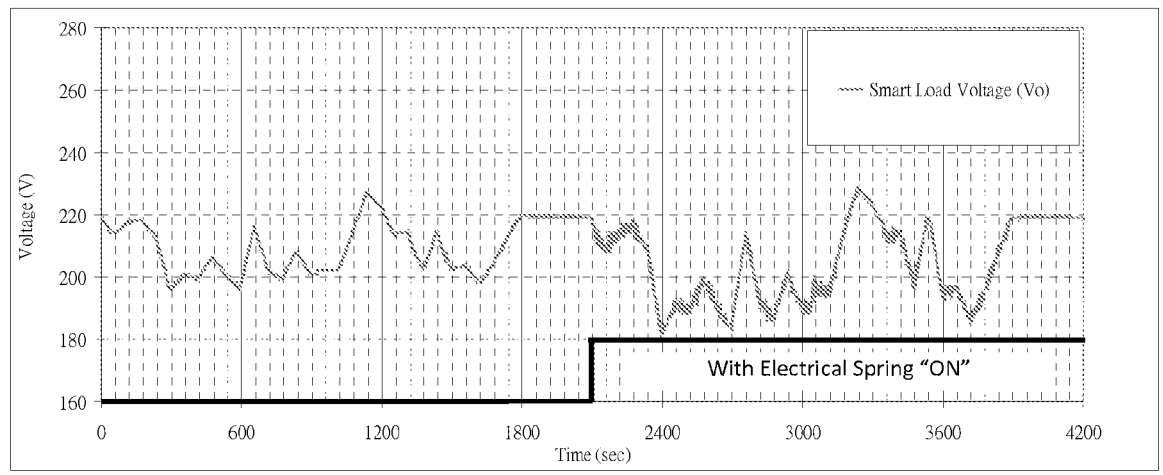
Figure 15C:
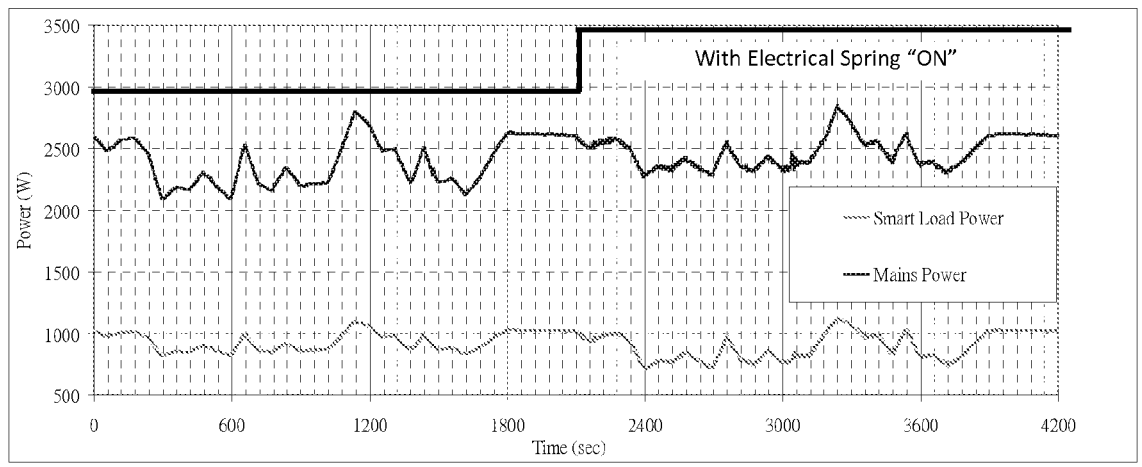
Figure 15D:
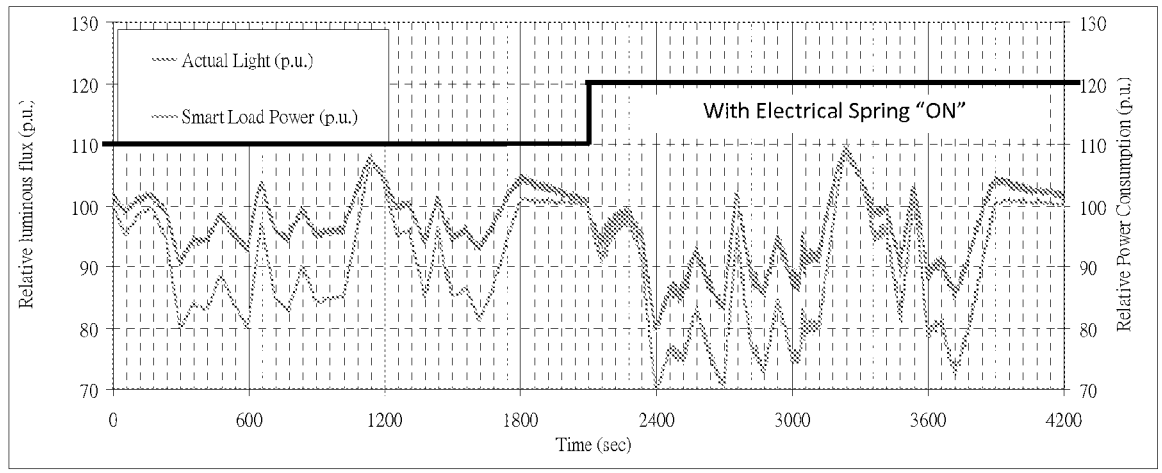
Figure 15E:
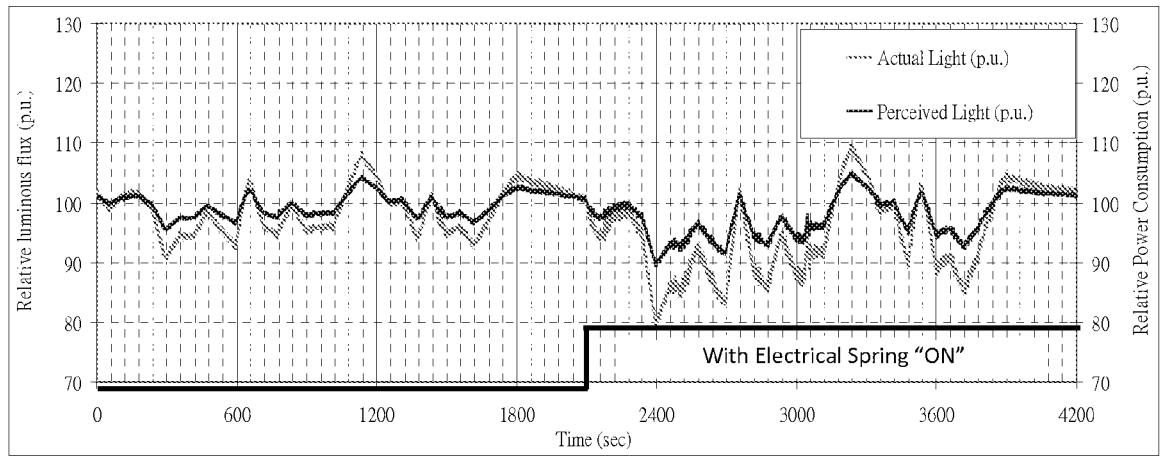
Figure 15F:
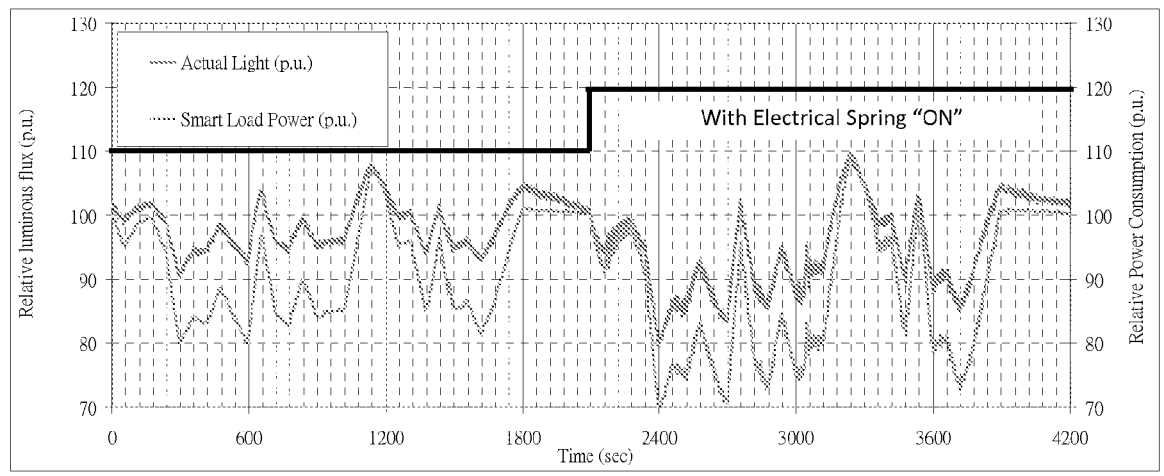

In order to demonstrate the practicality of embodiments of the present invention, a 10 kVA smart grid prototype system has been developed. In the system, an actual wind profile is fed into a three-phase inverter that generates power in a three-phase power line system in order to simulate the power generated from a wind farm. This experimental setup (illustrated in FIG. 13) simulates a practical situation in which the power line voltage is not well-regulated. Such a condition is an expected problem if the dynamically changing renewable energy sources generate a substantial amount of power into the smart grids.

The setup consists of two sets of loads. The load network 2 connected in series to the series reactive power controller 4 is together called the "smart load network". There is also a set of loads 10 that are connected directly to the power lines without smart control (labeled as "other loads" in FIG. 13). These loads 10 represent other loads that are not under the control of embodiments of the present invention in the same power grid. The smart load network in the test includes resistors (representing water heaters) and some ballast driven light-emitting diode LED devices (representing road lighting systems).

Two sets of tests have been conducted. The first series of tests involve the generation of an unstable mains, or supply, voltage with a sinusoidal fluctuation. Due to this dynamically changing nature, the power flow is not constant and there are obvious fluctuations in the power line voltage as recorded in FIGS. 14a-f. The measurements were captured initially with the "electric spring" (i.e. the series reactive power controller) turned off and the bypass switch S closed. Measurements were then captured with the "electric spring" (i.e. the reactive power controller 4) activated and the bypass switch S open.

Observations of FIGS. 14a-f lead to the following conclusions:

(1) When the proposed control with voltage stabilizing capacity is not activated (with the electric spring being off), the voltage regulation of the mains power supply 3 is very poor and the mains voltage deviates from the nominal value of 220V substantially.

(2) The voltage fluctuation of the mains power supply 3 can be substantially reduced and the mains voltage can be restored to the nominal value (220V in this test) when the proposed electric spring is activated.

(3) When the electric spring is activated, the load power (demand response), including active and/or reactive power, is adjusted in such a way to maintain the stability of the mains voltage to the nominal value. This is a demonstration of the load demand following the power generation with the objective of maintaining power grid stability.

(4) The power variation of the load 2 may be increased when electric spring is activated. This is a demonstration of the control objective of maintaining power grid stability. The smart load (i.e. the combination of the reactive power controller 4 and the load 2) now plays a role of maintaining power grid stability.

(5) Some degree of power supply voltage variation is acceptable for many types of loads 2 such as water heaters (which do not need constant power operation), lighting systems (because the degree of actual light variation will be reduced by the automatic adjustment of the pupils in human eyes), and some appliances that can tolerate supply voltage with wide variations.

Another set of tests have been conducted using a real wind speed profile. Measurements are recorded in FIGS. 15a-f. These practical results confirm that, by using the proposed basic unit comprising the load 2 and a series connected reactive power controller 4 and connecting the basic unit across the power lines, the power line voltage can be maintained. The load power will be adjusted in order to maintain the ac mains voltage to its nominal supply voltage value. This illustrates the fact that the smart load can react to the power supply conditions and play its role in maintaining power grid stability.

Figure 16A:
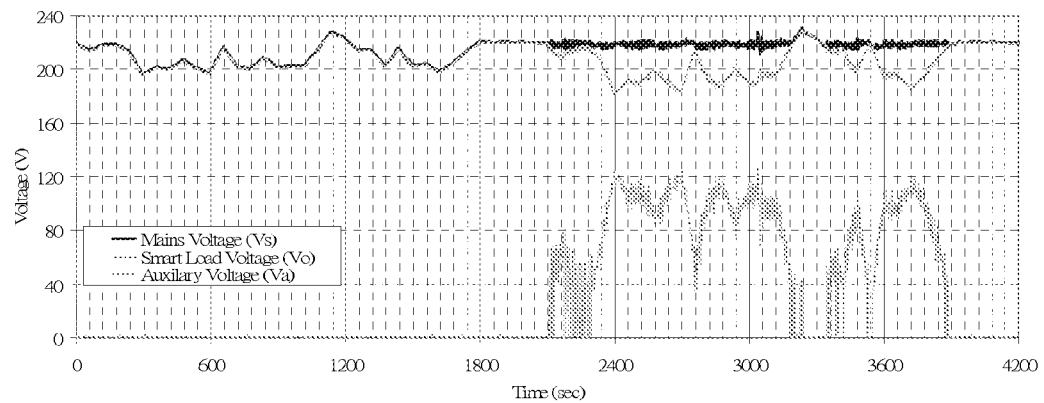
FIGS. 16a and 16b show further graphs of results from tests conducted using a simulated wind energy source supplying a power control circuit in accordance with an embodiment of the present invention, with the graphs showing various electrical parameters of the circuit during the tests.

In order to examine closely the functions of the electric spring, the rms voltage values of the power lines (Vs), the voltage across the smart load network and the voltage of the electric spring (Va) are plotted in FIG. 16a. The setup is designed to generate the same unstable voltage patterns in the mains twice by the simulated wind energy source. In the first half of the test when the first unstable voltage pattern is generated, the bypass switch S is closed and the electric spring is deactivated. The voltage of the smart load network is therefore the same as the mains voltage which fluctuates below the nominal value of 220V in this test. In the second half of the test, the same unstable voltage from the simulated wind energy source is generated. It should be noted that there some points in the programmed voltage pattern where the generated mains voltage reaches or exceeds 220V in FIG. 16a.

Figure 17:
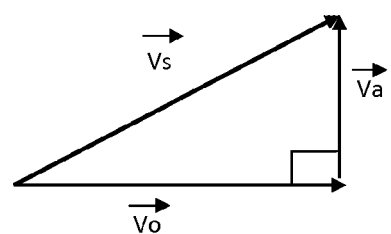
FIG. 17 is a vector diagram of various electrical parameters of the power control circuit of FIG. 12.

From FIG. 16a, it can be seen from the first half when the electric spring is turned off (i.e. bypass switch S is closed) that the voltage of the smart load network follows the unstable mains voltage pattern. When the bypass switch S is opened and the electric spring is turned on in the second half with the same unstable voltage pattern from the wind energy source, the auxiliary voltage generated by the electric spring varies in such a dynamical manner that the mains voltage of the power lines is restored closely to the preset nominal value of 220V. Note that the mains voltage vector of Vs is equal to the vectorial sum of voltage across the power controller 4, Va, and the voltage across the load 2, Vo. These are related in vectorial form as shown in FIG. 17. Their values in FIG. 16a are scalar values. It is important to note that when the generated mains voltage teaches or exceeds 220V, the voltage of the electric spring drops to zero. This measurement confirms the dynamic functions of the electric spring in providing reactive power compensation to maintain voltage regulation dynamically.

Figure 16B:
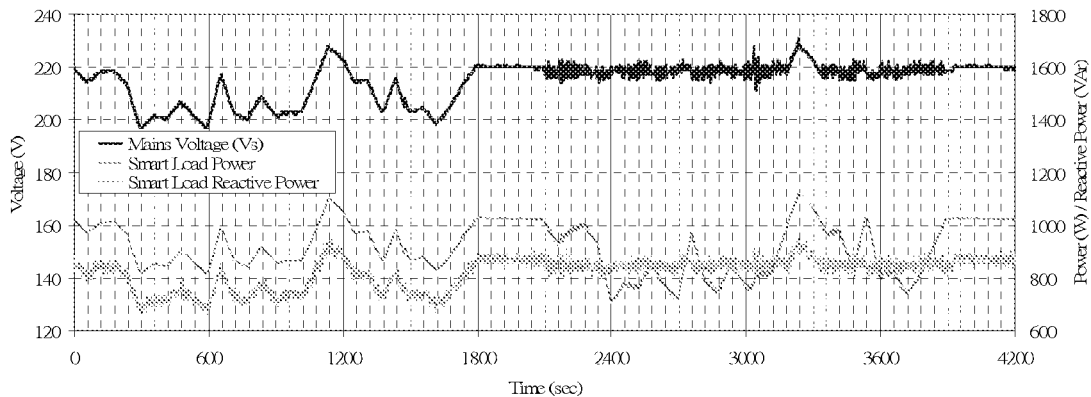

The measurements of the measured mains voltage, the active power and the reactive power of the smart load network are recorded and displayed together in FIG. 16b. It can be seen that, after the electric spring is activated in the second half of the test, the patterns of the active power and reactive power of the smart load network change from their previous patterns. Generally, there is a reduction of active power (i.e. some form of load shedding) and an increase of reactive power in the smart load network.

So far, the series-type smart-load concept based on Structure-1 in FIG. 10 has been practically demonstrated in a 10 kVA system for loads that can tolerate some degree of voltage variation, referred to as non-critical loads. Structure-1 illustrates the unique feature that using a series reactive power controller in series with an electric load can turn the combined unit into a smart load which can (1) provide reactive power compensation for mains power supply voltage regulation and (2) enable the load demand to follow a dynamic power (e.g. renewable or wind power) profile.

For loads that require tightly regulated voltage for smooth operation (such as electric lift and escalators with microprocessor or digital control), referred to as critical loads, the shunt-type structure in FIG. 10b will be more appropriate because the operation of the shunt reactive power controller serves to maintain good voltage regulation for the load without substantially affecting the active power consumption of the load.

In order to further clarify the operation of the power controller structures described above, reference is made again to FIG. 17. FIG. 17 shows the vector diagram of Vs, Va and Vo. Assuming that the load is a resistive one (R1) such as a water heater, the following equations can be derived from this vector diagram.

$$V_o^2 = V_s^2 - V_a^2 \tag{1}$$

$$P_1 = V_o^2 / R_1 \tag{2}$$

If there is another resistive load It2 connected directly across the mains voltage and not under the control of the electric spring, its power is $P_2 = V_s^2 / R_2$. For conservation of energy, the power generated ($P_{in}$) must be the same as the total power consumed. Therefore, Pin=P1+P2.

$$P_{in} = \frac{V_s^2 - V_a^2}{R_1} + \frac{V_s^2}{R_2} \tag{3}$$

Equation (3) now provides the mathematical relationship between power generated and power consumed. The first term on the right hand side of (3) is the power consumed by the non-critical load and the second term is the power consumed by other loads.

Figure 22:
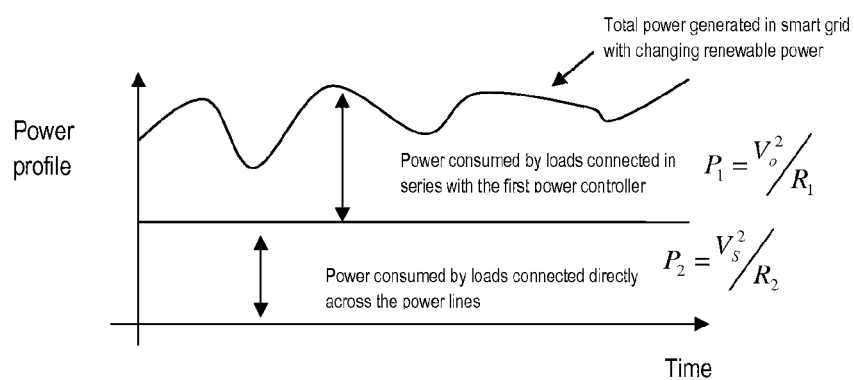
FIG. 22 is a schematic graph showing the power profiles of loads connected to a power control circuit in accordance with an embodiment of the present invention, and loads connected directly to the power supply instead of being not connected to a power control circuit in accordance with an embodiment of the present invention.

If Vs is kept constant by the input-voltage control method of embodiments of the present invention, then Vs in (3) is a constant. For any given load resistances R1 and R2, a reduction in wind power generation Pin leads to an increase of Va, and vice versa. An increase in Va, according to (1), results in a reduction in Vo, and therefore will decrease the load power according to (2), Therefore, these three equations provide the explanation for why the load demand will follow the wind power based on the proposed method. FIG. 22 further illustrates this point while comparing the power profiles of non-critical and critical loads.

In principle, the series and shunt arrangements can be combined to form the series-shunt arrangements as shown in FIG. 10c and FIG. 10d.

Figure 18:
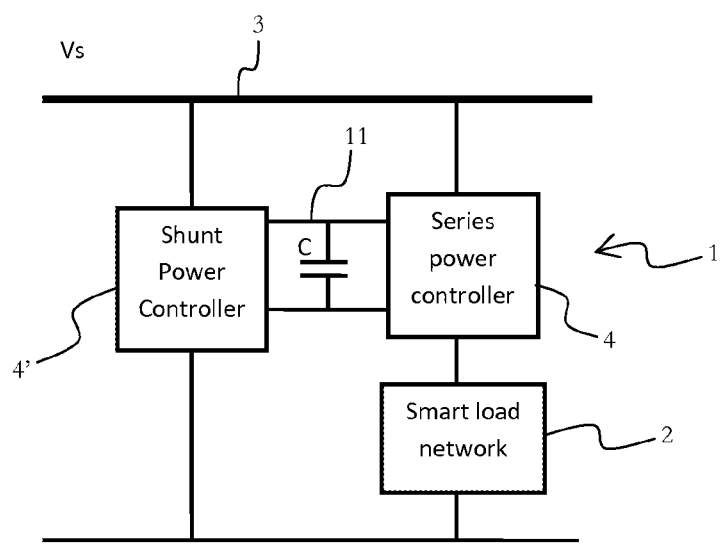
FIG. 18 is a schematic diagram of a series and shunt power control circuit in accordance with an embodiment of the present invention.

Structure-3 of FIG. 10c can be realized in the form as shown in FIG. 18. It should be noted that Structure-3 retains the novel feature that a series power controller 4 is connected in series, as a first power controller, with the load 2 and the combined unit is connected to the power lines 3. The power control circuit 1 of Structure-3, however, further includes a second power controller 4' connected in parallel across the series, or first, power controller 4 and the load 2. The second power controller 4' is also called a shunt power controller. Structure-3 offers other control function possibilities if the two power controllers are allowed to handle both active and reactive power. With the provision of a power transfer connection 11 between the shunt power controller 4' and the series power controller 4 (e.g. through sharing a capacitor storage element as in the cases of the circuits in FIGS. 18, 19 and 20), power flow among the two controllers 4 and 4' and also the load 2 can occur. If the series power controller 4 is used to absorb active power, the voltage vector Va will no longer be restricted to be perpendicular to the current vector To of the load. As mentioned, the power transfer connection 11 in the present embodiment is a shared capacitor storage element as shown in the circuits in FIGS. 18, 19 and 20. More particularly, the capacitor is connected in parallel across both the first and second power controllers 4 and 4'.

Figure 19A:
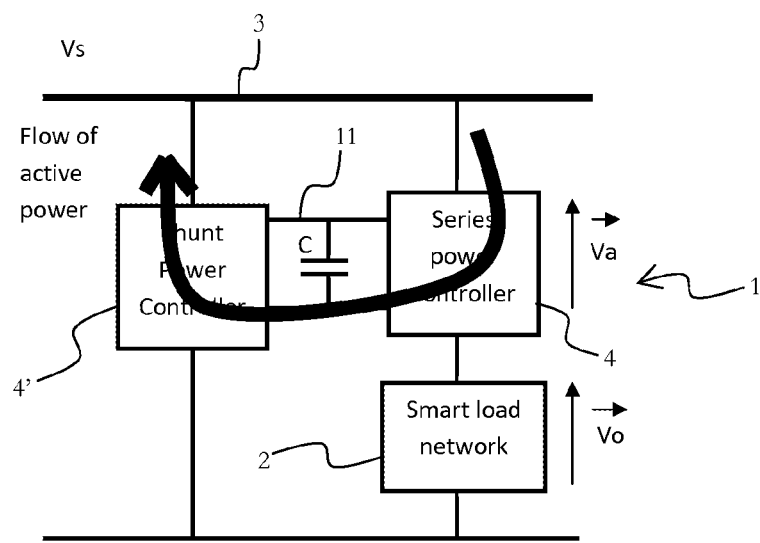
FIG. 19a is a schematic diagram of the power control circuit of FIG. 18 showing an example of the possible power flow in the power control circuit.
Figure 19B:
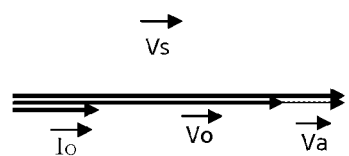
FIG. 19b is a vector diagram of various electrical parameters of the power control circuit of FIG. 18 showing the power control circuit absorbing and delivering active power only.

An example of this operation is to use the series power controller 4 to absorb active power, which is then transferred back to the power line 3 by the shunt power controller 4' in order to avoid necessary power loss. In the process as shown in FIG. 19a, the voltage vector of Va can be at any angle with respect with the current vector To. In this way, the voltage vector of the mains voltage Vs can be changed with a smaller voltage vector of Va (when compared with FIG. 17), allowing the voltage rating of the series controller 4 to be reduced. In addition, the adjustment of Vo means that the active power of the smart load can be controlled in this operating mode. In one extreme case, if the series power controller 4 absorbs only active power, the voltage vector of Va will be in phase with the current vector To as shown in FIG. 19b. Comparison of FIG. 17 and FIG. 19b shows that a smaller magnitude of vector of Va is needed to alter the load voltage Vo.

Figure 20:
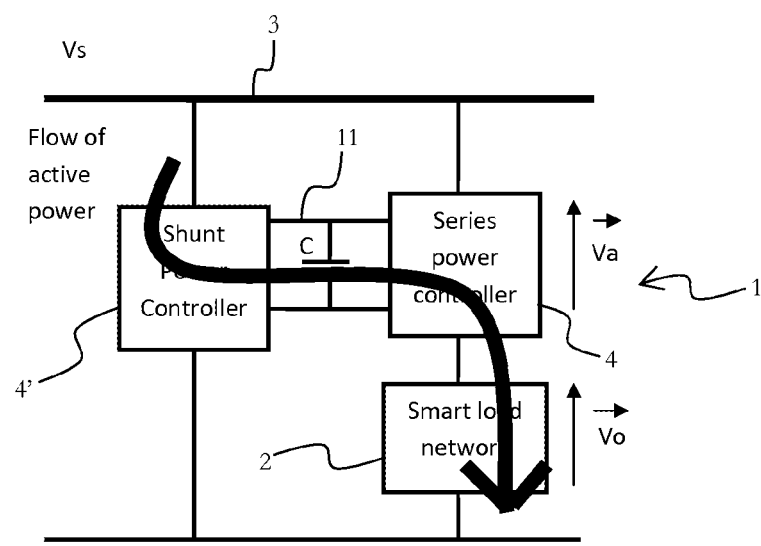
FIG. 20 is a schematic diagram of the power control circuit of FIG. 18 showing another example of the possible power flow in the power control circuit.
Figure 21:
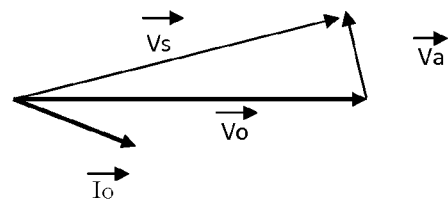
FIG. 21 is a vector diagram of various electrical parameters of the power control circuit of FIG. 18 showing the output voltage (Vo) being larger than the power supply voltage (Vs) and the power control circuit absorbing and delivering both active and reactive power.

Another example of using Structure-3 is described as follows. If the mains supply voltage exceeds the nominal supply voltage value Vs (e.g. due to excessive power generated momentarily), more power can flow into the load 2 as shown in FIG. 20 in order to absorb the excessive power so as to reduce the excessive voltage in the mains power supply 3. The power flow mechanism in FIG. 20 enables the load voltage Vo to be higher than the mains nominal supply voltage Vs as shown in the vector diagram in FIG. 21, in which the vector Va needs not to be perpendicular to the current vector lo.

Structure-4 shown in FIG. 10d suggests a means to boost the load voltage under control. In structure-4, the power control circuit 1 includes a second power controller 4', wherein the first power controller 4 is connected in series with the power supply 3 and the load 2, and the second power controller 4' (also known as a shunt power controller) is connected in parallel across the load 2.

In a simulation study of the embodiment in FIG. 10d, the series reactive power controller 4 is controlled in inductive mode and is simulated as an equivalent inductor with a series resistance. The shunt reactive power controller 4' is operated in capacitive mode and is thus represented as an equivalent capacitor with a small resistance. It will be appreciated that the power line voltage can be slightly boosted if necessary.

Because the proposed smart load methodology can be applied to many loads (such as water heaters, lighting systems, etc) that are usually installed all over cities and other power grids, these smart loads with voltage stabilizing ability provided by embodiments of the present invention will provide strong cushioning effects to reduce the voltage fluctuations of the power lines in large-scale smart grids, even when the dynamically changing nature of the power supply, due to for example the increasing amount of renewable energy sources, becomes increasingly influential in future smart grid systems.

The smart load methodology with reactive power control capability, as provided by embodiments of the present invention, essentially includes (1) reactive power compensation functions for voltage stability and (2) load power control. Using this invention, the demand response (load power) can now follow the power generation and play a supporting role in maintaining power line voltage stability, which is a unique feature required in future smart grids. For water heater applications, for example, the priority should and can be placed on security of the power grids. This means that loads may have to vary in order to maintain power grid stability. In the case of a drop in mains supply voltage, the smart load, as provided by embodiments of the present invention, should react with the priority of maintaining voltage stability.

As referred to above, FIG. 22 illustrates the difference in power profiles between non-critical loads and critical loads, where the non-critical loads are controlled by power control circuits or power controllers of the present invention. As can be clearly seen, the power of non-critical loads as controlled by power control circuits or power controllers of the present invention follows the dynamically changing power profile of the dynamically changing power supply, such as those based on renewable energy sources.

Figure 23:
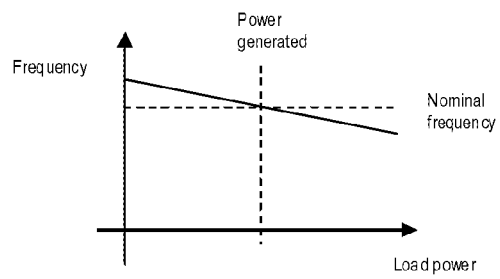
FIG. 23 is a schematic graph showing frequency instability in a power supply.

As mentioned previously, some embodiments of the present invention are adapted to stabilize the frequency of the power supply. For the electric power generators that supply power to the same smart grid, the frequency of the generators may deviate from the nominal values of 50 Hz or 60 Hz depending on the load demand. If the load demand exceeds the power generated, the frequency will be reduced slightly from the nominal value, and vice versa. Consequently, frequency instability might occur. This is shown schematically in FIG. 23.

Figure 24:
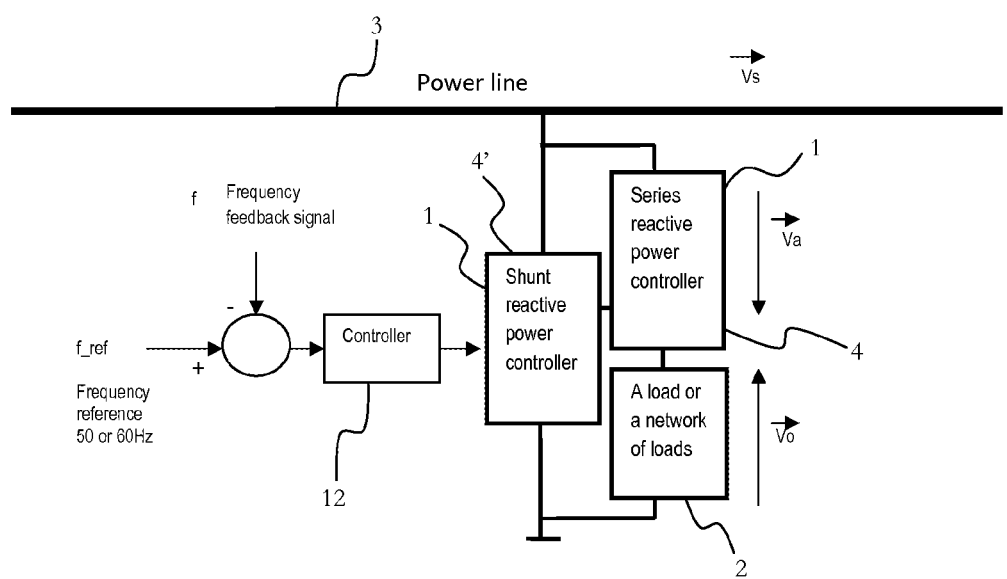
FIG. 24 is a schematic diagram of a power control circuit in accordance with an embodiment of the present invention with frequency control.

Structure-3, as described above, can be used to improve the frequency instability problem by controlling the real power of the non-critical load 2 as illustrated in FIG. 24. A reliable frequency feedback is compared with a reference frequency (of the nominal mains frequency 501-1z or 60

Hz). The frequency error can be fed to a frequency controller 12 which in turn control the first power controller 4 and the second power controller 4' such that:

(1) If the frequency is less than nominal value, the voltage across the load Vo will be reduced in order to shed some load power.

(2) If the frequency is higher than the nominal value, the voltage across the load Vo can be increased by created voltage across the first power controller such that Vo can exceed the nominal mains voltage value. In this way, more active power can be consumed by the non-critical load so as to reduce the frequency of the generators. If there are large amount of such controllable loads distributed over the electric grid, it would improve overall frequency regulation of the system.

In another aspect of the present invention, there is provided a method of stabilizing at least one electrical parameter of a power supply connectable to a load, the method including absorbing power from the power supply or delivering power to the power supply. In a preferred embodiment, the power supply is the power supply 3 described above and the load is the load 2 described above. The embodiment includes providing the power control circuit I, including providing the power controller 4 or the power controllers 4 and 4', as described above, for absorbing and delivering power. Other embodiments include method steps that have been previously described above or that will be easily appreciated from the above description.

In summary, in emerging smart grid power systems ("smart grids"), it is expected that renewable energy sources (such as wind farms and solar photovoltaic plants) with dynamically changing power flow will be installed. Future smart grids will be different from existing power grids in which the power generation is well-controlled by the power stations. The foreseeable massive penetration of renewable energy sources that are often distributed in the power grids would likely cause power system instabilities (such as instability and oscillations in voltage and frequency).

Particular embodiments of the present invention are related to the use of distributed reactive power controllers designed with or integrated with electric loads for improving the system voltage and frequency stability of smart power grid systems (smart grids), particularly those smart grids that have a significant portion of power coming from dynamically changing renewable energy sources such as wind and solar photovoltaic power plants. Instead of having a few centralized high-power reactive power controllers installed next to substations, it is proposed to distribute the reactive power control with many types of electric loads that are installed over the smart grids so that system stability, in the form of such as ac voltage and frequency stability, can be maintained in many regions spread over or distributed in the power network. Embodiments of the present invention include configurations that can be associated to electric loads with fairly high tolerance with wide variations in ac supply voltage such as lighting systems and heating systems, and also electric loads that require tight voltage regulations. Different from existing reactive power controllers that are connected directly across the power lines, the proposed smart electronic load of some embodiments of the invention has a reactive power controller connected in series with the loads.

As previously mentioned, power generation follows the load demand in traditional power systems. However, in future smart grids, it would be advantageous for the load demand to follow the dynamically changing power generation. In embodiments of the present invention, a new smart load concept with voltage and frequency stabilizing capacity based on the reactive power control approach is proposed. Each smart load of the proposed type has the voltage and frequency stabilizing capability in the local point of its installation. By installing this type of smart load with mains voltage and frequency regulation capability in a distributed manner in the power grids, the voltage and frequency stability of the smart grids can be enhanced. The proposed smart load concept with local power line voltage and frequency stability control provided by embodiments of the present invention can be implemented in many types of loads that are distributed in the cities and other power grids. Examples are water heating systems used domestically and industrially and lighting systems used in public areas (e.g. streets and highways) and buildings in general. Embodiments of the present invention include a basic unit that consists of a reactive power controller being in series with a load. This basic unit (i.e. a series reactive power controller and the load) will then be connected across the power lines. This basic unit is different from the convention use of a static VAR compensator which is connected across the power lines. Shunt reactive power controllers can be added to this basic structure.

As mentioned above, known reactive power controllers are concerned with controlling the output voltage, or Vo as referred to above, of the reactive power controller which is being supplied to the load. In particular, when using series reactive power controllers in existing applications, that is, power system voltage regulation and dimming lighting systems, the controlled variable is the output voltage (or Vo as referred to above) of the series reactive power controller.

Embodiments of the present invention abandon this traditional output voltage feedback and control methodology. More particularly, embodiments of the present invention control the input voltage (Vs) of the series reactive power controller, which is connected in series with a load. The output voltage (Vo) of the series reactive power controller is allowed to fluctuate dynamically according to the renewable power generation profile. This series reactive power controller (with input voltage Vs feedback and control) and the series-connected load will form a new smart load unit for power system stability control.

For stability control of smart grids with a substantial penetration of renewable energy sources, it has been suggested to use "central" control method to "turn off" some of the non-critical loads such as water heaters and refrigerators in order to ensure energy balance in the smart grids. In embodiments of the present invention, the proposed smart loads are expected to be distributed over smart grids and continue to operate at modified power levels under normal situations.

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. A power control circuit including a power controller having a power inverter and an energy storage element, said power control circuit having an input side and an output side, the power control circuit is connectable on the input side to AC mains and connectable on the output side to a non-critical load, the power control circuit being adapted to receive and absorb power from the AC mains when connected and to deliver power to the AC mains in order to stabilize a frequency of the AC mains when connected thereto, wherein said power controller further including a pulse-width-modulated (PWM) generator and a synchronization network with an input attached to the AC mains and an output providing phase information to the PWM generator, said PWM generator generates a switching signals for the power inverter, a comparator comparing an AC mains voltage with a reference voltage and producing a difference signal, a voltage controller receiving the difference signal and creating a control output to the PWM generator; wherein the AC mains has a dynamically changing non-zero power profile, and wherein stabilizing the AC mains frequency comprises the power controller modulating power provided to the non-critical load by changing the switching signal for the power inverter in order to follow the dynamically changing power profile of the AC mains.

2. The power control circuit according to claim 1 wherein the power stored and delivered by the power control circuit includes reactive power, or active power, or both.

3. The power control circuit according to claim 1 wherein the power control circuit maintains the AC mains at a nominal supply frequency.

4. The power control circuit according to claim 3 wherein the non-critical load has a load voltage and the power control circuit decreases the load voltage when the frequency of the AC mains is lower than the nominal supply frequency.

5. The power control circuit according to claim 3 wherein the non-critical load has a load voltage and the power control circuit increases the load voltage when the frequency of the AC mains is higher than the nominal supply frequency.

6. The power control circuit according claim 5 wherein the load voltage is increased to exceed a nominal supply voltage.

7. The power control circuit according to claim 3 wherein the non-critical load has a load voltage and the power control circuit provides an auxiliary voltage to increase or decrease the load voltage.

8. The power control circuit according to claim 1 including a first power controller for storing and delivering power thereby enabling the power control circuit to store and deliver power.

9. The power control circuit according to claim 8 wherein the power controller stores and delivers reactive power, or active power, or both.

10. The power control circuit according to claim 8 wherein the power controller is a reactive power controller.

11. The power control circuit according to claim 8 wherein the power controller is connected in series with the AC mains and the non-critical load.

12. The power control circuit according to claim 8 including a second power controller, and wherein the first power controller is connected in series with the AC mains and the non-critical load, and the second power controller is connected in parallel across the first power controller and the non-critical load.

13. The power control circuit according to claim 12 wherein the first and second power controllers are interconnected through a power transfer connection.

14. The power control circuit according to claim 13 wherein the power transfer connection includes an energy storage element.

15. The power control circuit according to claim 14 wherein the energy storage element is a capacitor connected in parallel across both the first and second power controllers.

16. The power control circuit according to claim 13 wherein either or both the first and second power controllers store and deliver power to the other of the first and second power controllers through the power transfer connection, and the other of the first and second power controllers stores and delivers power to the AC mains or to the non-critical load.

17. The power control circuit according to claim 13 wherein the first power controller stores and delivers active power to the second power controller through the power transfer connection, and the second power controller stores and delivers active power to the AC mains.

18. The power control circuit according to claim 13 wherein the second power controller stores and delivers power to the first power controller through the power transfer connection, and the first power controller stores and delivers power to the non-critical load.

19. The power control circuit according to claim 8 including a second power controller, and wherein the first power controller is connected in series with the AC mains and the non-critical load, and the second power controller is connected in parallel across the non-critical load.

20. The power control circuit according to claim 1 wherein the energy storage element is a capacitor or an inductor.

21. The power control circuit according to claim 1 wherein the power inverter has at least two levels.

22. The power control circuit according to claim 1 wherein the power inverter is a pulse-width modulation power inverter.

23. The power control circuit according to claim 1 including a frequency controller for detecting the frequency of the AC mains and providing a frequency control signal based on whether the frequency of the AC mains is above or below a nominal supply frequency, the power control circuit referring to the frequency control signal to store or deliver power when the frequency of the AC mains is above or below the nominal supply frequency, thereby maintaining the AC mains at the nominal supply frequency.

24. The power control circuit according to claim 23 wherein the frequency control signal is provided to a power controller for storing and delivering power thereby enabling the power control circuit to store and deliver power.

25. The power control circuit according to claim 24 wherein the frequency controller forms part of the power controller.

26. The power control circuit according to claim 1 wherein the non-critical load is a hot water heater or a non-critical lighting load.

27. The power control circuit according to claim 1 wherein the power control circuit is provided integrally with the non-critical load.

28. The power control circuit according to claim 1 including a bypass circuit having a bypass switch operable to connect the AC mains directly to the non-critical load through the bypass circuit.

29. The power control circuit according to claim 1 wherein the AC mains is generated by one or more dynamically changing renewable energy sources.

30. The power control circuit according to claim 1 including a capacitor connected to the power inverter so it can generate a high-voltage sinusoidal PWM voltage waveform, said capacitor being charged through anti-parallel diodes of the switches in the power inverter; and a low-pass LC filter across the output of the power inverter.

31. A method, comprising the steps of: providing a power control circuit having an input side and an output side, the power control circuit having a power inverter and an energy storage element, said power control circuit being connectable on the input side to AC mains and connectable on the output side to a non-critical load; and stabilizing a frequency of the AC mains when connected, wherein the stabilizing comprises: absorbing power from the AC mains; and delivering the power to the AC mains; wherein said power control circuit further including a pulse-width-modulated (PWM) generator and a synchronization network with an input attached to the AC mains and an output providing phase information to the PWM generator, said PWM generator generating a switching signals for the power inverter, a comparator comparing an AC mains voltage with a reference voltage and producing a difference signal, a voltage controller receiving the difference signal and creating a control output to the PWM generator; wherein the AC mains has a dynamically changing non-zero power profile, wherein the stabilizing further comprises the power control circuit modulating power provided to the non-critical load by changing the switching signal for the power inverter in order to follow the dynamically changing power profile of the AC mains.

32. The method according to claim 31 wherein the power being stored and being delivered includes reactive power, or active power, or both.

33. The method according to claim 31 further including delivering power to the non-critical load to stabilize the frequency of the AC mains.

34. The method according to claim 31 wherein the method includes maintaining the AC mains at a nominal supply frequency.

35. The method according to claim 34 wherein the non-critical load has a load voltage and the method includes decreasing the load voltage when the frequency of the AC mains is lower than the nominal supply frequency.

36. The method according to claim 34 wherein the non-critical load has a load voltage and the method includes increasing the load voltage when the frequency of the AC mains is higher than the nominal supply frequency.

37. The method according to claim 36 wherein the load voltage is increased to exceed a nominal supply voltage.

38. The method according to claim 34 wherein the non-critical load has a load voltage and the method includes providing an auxiliary voltage to increase or decrease the load voltage.

39. The method according to claim 31 including providing a first power controller for storing and delivering power.

40. The method according to claim 39 wherein the power controller is connected in series with the AC mains and the non-critical load.

41. The method according to claim 39 including providing a second power controller, wherein the first power controller is connected in series with the AC mains and the non-critical load, and the second power controller is connected in parallel across the first power controller and the non-critical load.

42. The method according to claim 39 including providing a second power controller, wherein the first power controller is connected in series with the AC mains and the non-critical load, and the second power controller is connected in parallel across the non-critical load.

43. The method according to claim 31 including providing a frequency controller for detecting the frequency of the AC mains and providing a frequency control signal based on whether the frequency of the AC mains is above or below a nominal supply frequency, referring to the frequency control signal to store or deliver power when the frequency of the AC mains is above or below the nominal supply frequency, thereby maintaining the AC mains at the nominal supply frequency.

44. The method according to claim 31 including providing the power control circuit for storing and delivering power.

45. The method according to claim 44 wherein the power control circuit is provided integrally with the non-critical load.

* * * * *